United States Patent
Gallo et al.

(10) Patent No.: US 11,995,854 B2
(45) Date of Patent: May 28, 2024

(54) MESH RECONSTRUCTION USING DATA-DRIVEN PRIORS

(71) Applicant: NVIDIA CORPORATION, Santa Clara, CA (US)

(72) Inventors: Orazio Gallo, Santa Cruz, CA (US); Abhishek Badki, Goleta, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/226,329

(22) Filed: Dec. 19, 2018

(65) Prior Publication Data

US 2020/0202622 A1    Jun. 25, 2020

(51) Int. Cl.
| | | |
|---|---|---|
| G06T 7/55 | (2017.01) | |
| G06F 17/16 | (2006.01) | |
| G06F 18/214 | (2023.01) | |
| G06N 20/00 | (2019.01) | |
| G06T 15/10 | (2011.01) | |
| G06T 17/20 | (2006.01) | |

(52) U.S. Cl.
CPC .............. *G06T 7/55* (2017.01); *G06F 17/16* (2013.01); *G06F 18/214* (2023.01); *G06N 20/00* (2019.01); *G06T 15/10* (2013.01); *G06T 17/205* (2013.01)

(58) Field of Classification Search
CPC ......... G06T 17/205; G06T 15/10; G06T 7/55; G06N 20/00; G06F 17/16; G06F 18/214; G06K 9/6256
See application file for complete search history.

(56) References Cited

U.S. PATENT DOCUMENTS

| | | | | |
|---|---|---|---|---|
| 5,185,850 A | * | 2/1993 | Usui | G06N 3/04 706/17 |
| 5,511,134 A | * | 4/1996 | Kuratomi | G06K 9/4628 382/158 |
| 5,542,006 A | * | 7/1996 | Shustorovich | G06K 9/32 382/156 |
| 5,912,986 A | * | 6/1999 | Shustorovich | G06K 9/32 382/156 |
| 6,028,956 A | * | 2/2000 | Shustorovich | G06K 9/3233 382/156 |

(Continued)

FOREIGN PATENT DOCUMENTS

| | | |
|---|---|---|
| CN | 103838548 A | 6/2014 |
| CN | 108898630 A | 11/2018 |
| WO | 2017131672 A1 | 8/2017 |

OTHER PUBLICATIONS

I. Ivrissimtzis, C. Rossl and H. .-P. Seidel, "A divide and conquer algorithm for triangle mesh connectivity encoding," 10th Pacific Conference on Computer Graphics and Applications, 2002. Proceedings., Beijing, China, 2002, pp. 294-303, doi: 10.1109/PCCGA .2002.1167873. (Year: 2002).*

(Continued)

*Primary Examiner* — Charles L Beard
(74) *Attorney, Agent, or Firm* — Davis Wright Tremaine LLP

(57) ABSTRACT

One embodiment of a method includes predicting one or more three-dimensional (3D) mesh representations based on a plurality of digital images, wherein the one or more 3D mesh representations are refined by minimizing at least one difference between the one or more 3D mesh representations and the plurality of digital images.

2 Claims, 8 Drawing Sheets

(56) References Cited

U.S. PATENT DOCUMENTS

| | | | | |
|---|---|---|---|---|
| 6,047,088 A * | 4/2000 | van Beek | G06T 9/001 | 375/E7.083 |
| 6,175,818 B1 * | 1/2001 | King | G10L 17/00 | 704/202 |
| 6,738,062 B1 * | 5/2004 | Moreton | G06T 17/20 | 345/423 |
| 6,819,790 B2 * | 11/2004 | Suzuki | G06T 7/0012 | 382/130 |
| 7,149,564 B2 * | 12/2006 | Vining | A61B 5/1076 | 600/425 |
| 7,184,041 B2 * | 2/2007 | Heng | G06T 15/04 | 345/424 |
| 7,545,965 B2 * | 6/2009 | Suzuki | G06T 5/007 | 382/128 |
| 8,289,318 B1 | 10/2012 | Hadap et al. | | |
| 8,396,268 B2 * | 3/2013 | Zabair | G06K 9/00 | 128/922 |
| 8,538,108 B2 * | 9/2013 | Shekhar | G06T 3/0081 | 378/901 |
| 8,576,250 B2 * | 11/2013 | Sabiston | G06T 19/20 | 345/646 |
| 8,654,121 B1 * | 2/2014 | Yu | G06T 17/205 | 345/428 |
| 8,830,235 B1 * | 9/2014 | Guskov | G06T 17/205 | 345/420 |
| 9,001,123 B1 * | 4/2015 | Ames | G06T 17/205 | 345/419 |
| 9,024,939 B2 * | 5/2015 | Sabiston | A61F 2/5046 | 345/418 |
| 9,202,144 B2 * | 12/2015 | Wang | G06K 9/66 | |
| 9,589,383 B2 * | 3/2017 | Mueller-Fischer | G06T 13/20 | |
| 9,947,102 B2 * | 4/2018 | Xu | G06N 3/084 | |
| 9,965,863 B2 * | 5/2018 | Xu | G06T 7/174 | |
| 9,968,257 B1 * | 5/2018 | Burt | A61B 5/7267 | |
| 9,996,771 B2 * | 6/2018 | Clayton | G06K 9/66 | |
| 10,002,419 B2 * | 6/2018 | Rapaka | G06T 7/11 | |
| 10,004,471 B2 * | 6/2018 | Madabhushi | G06T 11/008 | |
| 10,032,281 B1 * | 7/2018 | Ghesu | G06T 7/149 | |
| 10,311,334 B1 * | 6/2019 | Florez Choque | G06K 9/6231 | |
| 10,318,891 B1 * | 6/2019 | Hemmer | G06T 9/00 | |
| 10,346,524 B1 * | 7/2019 | Zheng | G06N 3/0472 | |
| 10,346,728 B2 * | 7/2019 | Fu | G06N 20/00 | |
| 10,346,986 B2 * | 7/2019 | Xu | G06N 3/04 | |
| 10,373,313 B2 * | 8/2019 | Ghesu | G06T 7/75 | |
| 10,402,726 B1 * | 9/2019 | Moore | G06N 3/10 | |
| 10,482,674 B1 * | 11/2019 | Wu | G06T 19/006 | |
| 10,489,683 B1 * | 11/2019 | Koh | G06K 9/6232 | |
| 10,489,708 B2 * | 11/2019 | DeTone | G06T 7/174 | |
| 10,492,723 B2 * | 12/2019 | Madabhushi | G06K 9/6262 | |
| 10,504,004 B2 * | 12/2019 | Kaufhold | G06K 9/6257 | |
| 10,504,005 B1 * | 12/2019 | Walters | G06K 9/6298 | |
| 10,937,236 B1 * | 3/2021 | St-Pierre | G06T 17/20 | |
| 10,937,237 B1 * | 3/2021 | Kim | G06T 7/75 | |
| 10,990,848 B1 * | 4/2021 | Pahde | G06T 15/04 | |
| 11,010,951 B1 * | 5/2021 | Schwartz | G06F 3/012 | |
| 11,113,880 B1 * | 9/2021 | LaFayette | G06T 17/205 | |
| 2002/0159518 A1 * | 10/2002 | Bottreau | H04N 19/54 | 375/240.1 |
| 2003/0063086 A1 * | 4/2003 | Baumberg | G06T 17/205 | 345/420 |
| 2004/0202381 A1 * | 10/2004 | Kitajima | H04N 5/3572 | 382/275 |
| 2004/0249617 A1 * | 12/2004 | Lau | H04N 19/423 | 703/2 |
| 2005/0089213 A1 * | 4/2005 | Geng | G06K 9/00214 | 382/154 |
| 2005/0251021 A1 * | 11/2005 | Kaufman | A61B 5/411 | 600/407 |
| 2006/0044309 A1 * | 3/2006 | Kanai | G06T 17/205 | 345/423 |
| 2007/0036414 A1 * | 2/2007 | Georgescu | G06T 7/12 | 382/128 |
| 2007/0165948 A1 * | 7/2007 | Laffargue | G06T 17/20 | 382/173 |
| 2007/0211939 A1 * | 9/2007 | Kaus | G06T 7/149 | 382/173 |
| 2008/0123927 A1 * | 5/2008 | Miga | G06T 7/344 | 382/131 |
| 2008/0204832 A1 * | 8/2008 | Haikin | H04N 1/60 | 358/518 |
| 2010/0111370 A1 * | 5/2010 | Black | G06K 9/00369 | 382/111 |
| 2010/0290679 A1 * | 11/2010 | Gasser | G06T 7/00 | 382/128 |
| 2011/0025690 A1 | 2/2011 | Tzur et al. | | |
| 2011/0091118 A1 * | 4/2011 | Ahn | G06T 9/00 | 382/232 |
| 2011/0295579 A1 * | 12/2011 | Tang | A61B 6/466 | 703/9 |
| 2011/0304619 A1 * | 12/2011 | Fu | G06T 17/00 | 345/420 |
| 2012/0134564 A1 * | 5/2012 | Zheng | G06T 7/149 | 382/131 |
| 2012/0189178 A1 * | 7/2012 | Seong | G06T 11/008 | 382/128 |
| 2012/0230566 A1 * | 9/2012 | Dean | G06T 19/00 | 382/131 |
| 2013/0096899 A1 * | 4/2013 | Usadi | G06F 17/5018 | 703/10 |
| 2013/0114910 A1 * | 5/2013 | Mammou | G06T 9/004 | 382/233 |
| 2013/0124148 A1 | 5/2013 | Jin et al. | | |
| 2013/0223704 A1 * | 8/2013 | Lay | G06T 7/11 | 382/128 |
| 2013/0259345 A1 * | 10/2013 | El-Baz | G06T 7/0012 | 382/131 |
| 2014/0029823 A1 * | 1/2014 | Birkbeck | G06T 7/149 | 382/131 |
| 2014/0036054 A1 * | 2/2014 | Zouridakis | A61B 5/0077 | 348/77 |
| 2014/0219550 A1 * | 8/2014 | Popa | G06K 9/00342 | 382/154 |
| 2014/0241570 A1 * | 8/2014 | Onen | G06F 3/017 | 382/103 |
| 2015/0112901 A1 * | 4/2015 | Singer | G06N 5/04 | 706/12 |
| 2015/0146971 A1 | 5/2015 | Robert et al. | | |
| 2015/0178988 A1 | 6/2015 | Montserrat Mora et al. | | |
| 2015/0206504 A1 * | 7/2015 | Pajak | G09G 5/02 | 345/589 |
| 2015/0213646 A1 * | 7/2015 | Ma | G06T 17/20 | 345/420 |
| 2015/0324999 A1 * | 11/2015 | Gritsenko | G06T 7/149 | 382/132 |
| 2016/0055237 A1 * | 2/2016 | Tuzel | G06F 16/353 | 382/224 |
| 2016/0058520 A1 * | 3/2016 | Yang | G16H 50/50 | 703/11 |
| 2016/0110632 A1 * | 4/2016 | Kiraly | G06K 9/66 | 382/128 |
| 2016/0117859 A1 * | 4/2016 | Perbet | G06T 17/205 | 345/423 |
| 2016/0174902 A1 * | 6/2016 | Georgescu | G06T 7/73 | 600/408 |
| 2016/0292847 A1 * | 10/2016 | Liu | G06T 19/20 | |
| 2016/0360180 A1 * | 12/2016 | Cole | H04N 19/597 | |
| 2017/0018088 A1 * | 1/2017 | Jeong | G06T 15/04 | |
| 2017/0046616 A1 * | 2/2017 | Socher | G06K 9/4628 | |
| 2017/0046868 A1 * | 2/2017 | Chernov | G06T 15/04 | |
| 2017/0078170 A1 * | 3/2017 | Vasseur | H04L 69/22 | |
| 2017/0109881 A1 * | 4/2017 | Avendi | G06T 7/149 | |
| 2017/0140236 A1 * | 5/2017 | Price | G06K 9/4628 | |
| 2017/0140260 A1 * | 5/2017 | Manning | G06N 3/04 | |
| 2017/0161635 A1 * | 6/2017 | Oono | G06N 7/005 | |
| 2017/0185740 A1 * | 6/2017 | Seegerer | A61B 6/032 | |
| 2017/0206464 A1 * | 7/2017 | Clayton | G06N 3/0454 | |
| 2017/0262479 A1 * | 9/2017 | Chester | G06F 16/583 | |
| 2017/0281094 A1 * | 10/2017 | Ghaboussi | A61B 5/7264 | |
| 2017/0287137 A1 * | 10/2017 | Lin | G06K 9/66 | |

(56) References Cited

U.S. PATENT DOCUMENTS

| | | | |
|---|---|---|---|
| 2017/0337343 A1* | 11/2017 | Kakadiaris | G06F 19/00 |
| 2017/0337682 A1* | 11/2017 | Liao | G06T 7/30 |
| 2017/0357406 A1* | 12/2017 | Yi | A61B 6/469 |
| 2017/0357896 A1* | 12/2017 | Tsatsin | G06N 3/084 |
| 2017/0358133 A1* | 12/2017 | Iverson | H04N 13/106 |
| 2017/0371017 A1* | 12/2017 | Odry | G01R 33/5602 |
| 2017/0372480 A1* | 12/2017 | Anand | G06F 17/5009 |
| 2018/0012411 A1* | 1/2018 | Richey | G06T 7/73 |
| 2018/0041536 A1* | 2/2018 | Berlin | G06N 3/04 |
| 2018/0046649 A1* | 2/2018 | Dal Mutto | G06N 3/02 |
| 2018/0047208 A1* | 2/2018 | Marin | G06T 11/001 |
| 2018/0061058 A1* | 3/2018 | Xu | G06N 3/084 |
| 2018/0061059 A1* | 3/2018 | Xu | G06N 3/04 |
| 2018/0089888 A1* | 3/2018 | Ondruska | G06T 15/08 |
| 2018/0101784 A1* | 4/2018 | Rolfe | G06K 9/6256 |
| 2018/0101989 A1* | 4/2018 | Frueh | G06F 16/5838 |
| 2018/0115785 A1* | 4/2018 | Lee | H04N 19/172 |
| 2018/0129893 A1* | 5/2018 | Son | G06K 9/00979 |
| 2018/0150929 A1* | 5/2018 | Pheiffer | G06T 7/30 |
| 2018/0157964 A1* | 6/2018 | Hsu | G06N 3/04 |
| 2018/0165573 A1* | 6/2018 | Hsu | G06N 3/063 |
| 2018/0174311 A1* | 6/2018 | Kluckner | G06K 9/3233 |
| 2018/0182101 A1* | 6/2018 | Petersen | G06T 7/60 |
| 2018/0182152 A1* | 6/2018 | Pan | G06T 17/205 |
| 2018/0234348 A1* | 8/2018 | Goloubew | H04L 41/142 |
| 2018/0247201 A1* | 8/2018 | Liu | G06T 1/00 |
| 2018/0247227 A1* | 8/2018 | Holtham | G06K 9/6215 |
| 2018/0247427 A1* | 8/2018 | Geiger | G06T 7/73 |
| 2018/0260532 A1* | 9/2018 | Dweik | G05B 13/0265 |
| 2018/0268262 A1* | 9/2018 | Osada | G06K 9/4628 |
| 2018/0285715 A1* | 10/2018 | Son | G06N 3/08 |
| 2018/0286120 A1* | 10/2018 | Fleishman | G06T 17/205 |
| 2018/0314937 A1* | 11/2018 | Zarar | G06N 3/08 |
| 2018/0315232 A1* | 11/2018 | Jones | G06T 15/005 |
| 2018/0322623 A1* | 11/2018 | Memo | G06N 3/084 |
| 2018/0330511 A1* | 11/2018 | Ha | G06T 7/30 |
| 2018/0330551 A1* | 11/2018 | Andersson | G06T 19/20 |
| 2018/0338742 A1* | 11/2018 | Singh | A61B 6/4464 |
| 2018/0350132 A1* | 12/2018 | Paulson | G06T 17/10 |
| 2018/0374274 A1* | 12/2018 | Selvarajan | G06T 19/20 |
| 2019/0004543 A1* | 1/2019 | Kennedy | H04N 5/23296 |
| 2019/0005343 A1* | 1/2019 | Srivastava | G06K 9/00993 |
| 2019/0018933 A1* | 1/2019 | Oono | G06N 7/08 |
| 2019/0019331 A1* | 1/2019 | Alliez | G06F 17/17 |
| 2019/0026631 A1* | 1/2019 | Carr | G06N 3/088 |
| 2019/0026917 A1* | 1/2019 | Liao | G06K 9/00208 |
| 2019/0026942 A1* | 1/2019 | Zhang | G06T 7/251 |
| 2019/0030371 A1* | 1/2019 | Han | A61N 5/1039 |
| 2019/0035150 A1* | 1/2019 | Owechko | G06T 17/20 |
| 2019/0042918 A1* | 2/2019 | Meyer | H04W 4/44 |
| 2019/0042981 A1* | 2/2019 | Bendfeldt | G06F 9/451 |
| 2019/0043201 A1* | 2/2019 | Strong | G06K 9/00993 |
| 2019/0050981 A1* | 2/2019 | Song | G06N 5/046 |
| 2019/0073580 A1* | 3/2019 | Dzhulgakov | G06Q 30/0241 |
| 2019/0073581 A1* | 3/2019 | Chen | G06Q 30/0251 |
| 2019/0073586 A1* | 3/2019 | Chen | G06N 7/005 |
| 2019/0073590 A1* | 3/2019 | Wu | G06N 3/063 |
| 2019/0080512 A1* | 3/2019 | Johansson | G06T 17/205 |
| 2019/0088004 A1* | 3/2019 | Lucas | G06N 6/202 |
| 2019/0095698 A1* | 3/2019 | Cole | G06K 9/00268 |
| 2019/0095798 A1* | 3/2019 | Baker | G06N 3/0445 |
| 2019/0102678 A1* | 4/2019 | Chang | G06N 3/084 |
| 2019/0105009 A1* | 4/2019 | Siemionow | A61B 6/5229 |
| 2019/0108396 A1* | 4/2019 | Dal Mutto | G06K 9/00771 |
| 2019/0108679 A1* | 4/2019 | Wang | G06T 17/20 |
| 2019/0110038 A1* | 4/2019 | DiVerdi | G06N 3/02 |
| 2019/0114537 A1* | 4/2019 | Wesolowski | G06N 3/10 |
| 2019/0114540 A1* | 4/2019 | Lee | G06N 3/08 |
| 2019/0122106 A1* | 4/2019 | Lee | G06N 3/063 |
| 2019/0138786 A1* | 5/2019 | Trenholm | G06K 9/6255 |
| 2019/0142519 A1* | 5/2019 | Siemionow | G02B 27/017 |
| | | | 600/408 |
| 2019/0147220 A1* | 5/2019 | McCormac | G06K 9/00201 |
| | | | 382/103 |
| 2019/0147221 A1* | 5/2019 | Grabner | G06K 9/00214 |
| 2019/0147253 A1* | 5/2019 | Bai | G08G 1/167 |
| | | | 382/103 |
| 2019/0147335 A1* | 5/2019 | Wang | G06N 3/0454 |
| | | | 706/20 |
| 2019/0163747 A1* | 5/2019 | Kang | G06F 17/2809 |
| 2019/0164055 A1* | 5/2019 | Ljung Larhed | G06N 3/084 |
| 2019/0164268 A1* | 5/2019 | Gallo | G06N 20/00 |
| 2019/0164301 A1* | 5/2019 | Kim | G06K 9/6256 |
| 2019/0164351 A1* | 5/2019 | Kim | G06T 15/04 |
| 2019/0173552 A1* | 6/2019 | Decurninge | H04L 5/0048 |
| 2019/0179858 A1* | 6/2019 | Douze | G06Q 50/01 |
| 2019/0180499 A1* | 6/2019 | Caulfield | G06T 19/006 |
| 2019/0183576 A1* | 6/2019 | Fahim | A61B 34/10 |
| 2019/0192880 A1* | 6/2019 | Hibbard | G16H 30/40 |
| 2019/0199743 A1* | 6/2019 | La Marca | H04L 63/1425 |
| 2019/0220573 A1* | 7/2019 | Kwon | G06N 3/04 |
| 2019/0220691 A1* | 7/2019 | Valpola | G06K 9/6256 |
| 2019/0228110 A1* | 7/2019 | Yan | G06F 17/50 |
| 2019/0228312 A1* | 7/2019 | Andoni | G06F 17/18 |
| 2019/0228330 A1* | 7/2019 | Kaifosh | G06F 3/014 |
| 2019/0228590 A1* | 7/2019 | Kaifosh | G06F 3/011 |
| 2019/0236362 A1* | 8/2019 | Srivastava | G06K 9/00201 |
| 2019/0236809 A1* | 8/2019 | Graziosi | G06T 7/10 |
| 2019/0237186 A1* | 8/2019 | El-Baz | A61B 5/201 |
| 2019/0244423 A1* | 8/2019 | Brettle | G06T 15/04 |
| 2019/0250998 A1* | 8/2019 | Bedadala | G06F 11/1453 |
| 2019/0251694 A1* | 8/2019 | Han | G06T 7/11 |
| 2019/0253452 A1* | 8/2019 | Latapie | G06F 16/182 |
| 2019/0253614 A1* | 8/2019 | Oleson | H04N 5/23216 |
| 2019/0259216 A1* | 8/2019 | Gambaretto | G06T 19/20 |
| 2019/0261945 A1* | 8/2019 | Funka-Lea | A61B 8/12 |
| 2019/0271966 A1* | 9/2019 | Coffman | G06N 20/00 |
| 2019/0272631 A1* | 9/2019 | Shemonski | A61B 3/0025 |
| 2019/0278292 A1* | 9/2019 | Levinson | G01S 15/89 |
| 2019/0287230 A1* | 9/2019 | Lu | G06T 7/0004 |
| 2019/0287301 A1* | 9/2019 | Colbert | G06N 3/08 |
| 2019/0294961 A1* | 9/2019 | Zuev | G06K 9/6255 |
| 2019/0295282 A1* | 9/2019 | Smolyanskiy | G06K 9/6215 |
| 2019/0295318 A1* | 9/2019 | Levinson | G06T 17/05 |
| 2019/0303745 A1* | 10/2019 | Lin | G06N 3/0454 |
| 2019/0304184 A1* | 10/2019 | Wrotek | G06T 9/001 |
| 2019/0304480 A1* | 10/2019 | Narayanan | G06F 3/16 |
| 2019/0318244 A1* | 10/2019 | Alvarez | G06N 3/08 |
| 2019/0332729 A1* | 10/2019 | Villongco | G06F 17/5009 |
| 2019/0332900 A1* | 10/2019 | Sjolund | A61N 5/1039 |
| 2019/0333224 A1* | 10/2019 | Liu | G06K 9/6256 |
| 2019/0333643 A1* | 10/2019 | Villongco | G06K 9/6215 |
| 2019/0336109 A1* | 11/2019 | Pheiffer | A61B 8/13 |
| 2019/0340541 A1* | 11/2019 | Watson | G06N 20/00 |
| 2019/0340716 A1* | 11/2019 | Cella | G06Q 40/04 |
| 2019/0347105 A1* | 11/2019 | Cella | G06Q 30/0201 |
| 2019/0347553 A1* | 11/2019 | Lo | G06N 3/063 |
| 2019/0354804 A1* | 11/2019 | Ros Sanchez | G06N 20/00 |
| 2019/0355150 A1* | 11/2019 | Tremblay | G06N 3/08 |
| 2019/0356905 A1* | 11/2019 | Godard | G06T 7/593 |
| 2019/0362530 A1* | 11/2019 | Shimakawa | G06T 7/70 |
| 2019/0362551 A1* | 11/2019 | Sheffield | G06F 16/5854 |
| 2019/0370435 A1* | 12/2019 | Sha | G06F 17/5081 |
| 2019/0371080 A1* | 12/2019 | Sminchisescu | G06T 19/00 |
| 2019/0373264 A1* | 12/2019 | Chong | H04L 69/04 |
| 2019/0377848 A1* | 12/2019 | Sha | G06F 17/5081 |
| 2019/0377955 A1* | 12/2019 | Swaminathan | G11B 27/031 |
| 2019/0378049 A1* | 12/2019 | Widmann | G06N 20/00 |
| 2019/0378050 A1* | 12/2019 | Edkin | G06Q 30/0185 |
| 2019/0378051 A1* | 12/2019 | Widmann | G06Q 30/0185 |
| 2019/0378332 A1* | 12/2019 | Sun | G06T 15/04 |
| 2020/0027246 A1* | 1/2020 | Hemmer | G06K 9/00201 |
| 2020/0074295 A1* | 3/2020 | O'Donncha | G06K 9/6256 |
| 2020/0098137 A1* | 3/2020 | Hemmer | G06T 9/001 |
| 2020/0099954 A1* | 3/2020 | Hemmer | H04N 19/186 |
| 2020/0151952 A1* | 5/2020 | Aksit | G06N 3/045 |
| 2020/0153885 A1* | 5/2020 | Lee | H04N 13/194 |
| 2020/0195526 A1* | 6/2020 | Eberlein | H04L 41/5054 |
| 2020/0273248 A1* | 8/2020 | Jørgensen | G06T 17/205 |
| 2020/0294194 A1* | 9/2020 | Sun | G06T 3/4038 |
| 2020/0342263 A1* | 10/2020 | Gallo | G06K 9/6262 |
| 2021/0201075 A1* | 7/2021 | Pahde | G06T 17/20 |
| 2021/0225089 A1* | 7/2021 | Yao | G06T 19/20 |
| 2021/0279952 A1* | 9/2021 | Chen | G06T 17/00 |

(56) References Cited

U.S. PATENT DOCUMENTS

| | | | | |
|---|---|---|---|---|
| 2021/0279956 | A1* | 9/2021 | Chandran | G06T 17/20 |
| 2021/0287430 | A1* | 9/2021 | Li | G06V 10/776 |
| 2021/0295606 | A1* | 9/2021 | Kim | G06T 17/20 |
| 2021/0343082 | A1* | 11/2021 | Kim | G06T 9/001 |
| 2021/0383616 | A1* | 12/2021 | Rong | G06T 19/20 |
| 2021/0386359 | A1* | 12/2021 | Adeli-Mosabbeb | A61B 5/1101 |
| 2022/0130110 | A1* | 4/2022 | Zhang | G06N 3/08 |
| 2022/0130127 | A1* | 4/2022 | Zhang | G06T 17/205 |
| 2022/0392162 | A1* | 12/2022 | Shen | G06T 17/20 |
| 2023/0081791 | A1* | 3/2023 | Burgess | G06T 17/20 345/418 |
| 2023/0140460 | A1* | 5/2023 | Munkberg | G06N 3/045 345/423 |

OTHER PUBLICATIONS

Kingma et al., "Auto-Encoding Variational Bayes", https://arxiv.org/abs/1312.6114, 2013, pp. 1-14.

Umetani, Nobuyuki, "Exploring Generative 3D Shapes Using Autoencoder Networks", https://doi.org/10.1145/3145749.3145758, In SIGGRAPH Asia 2017 Technical Briefs, SA '17, Nov. 2017, pp. 24:1-24:4.

Sabour et al., "Dynamic Routing Between Capsules", https://arxiv.org/abs/1710.09829, NIPS, 2017, pp. 1-11.

Bloesch et al., "CodeSLAM—Learning a Compact, Optimisable Representation for Dense Visual SLAM", https://arxiv.org/abs/1804.00874, 2018, 10 pages.

Zhu et al., "Object-Centric Photometric Bundle Adjustment with Deep Shape Prior", https://arxiv.org/abs/1711.01470, 2017, pp. 1-9.

Kato et al., "Neural 3d Mesh Renderer", In The IEEE Conference on Computer Vision and Pattern Recognition (CVPR), https://arxiv.org/abs/1711.07566, 2018, pp. 1-17.

Godard et al., "Unsupervised Monocular Depth Estimation with Left-Right Consistency", In Computer Vision and Pattern Recognition (CVPR), https://arxiv.org/abs/1609.03677, 2017, pp. 1-14.

Tulsiani et al., "Multi-view Supervision for Single-view Reconstruction via Differentiable Ray Consistency", In Computer Vision and Pattern Recognition (CVPR), https://arxiv.org/abs/1704.06254, 2017, pp. 1-13.

Badki et al., "Computational Zoom: A Framework for Post-Capture Image Composition", https://doi.org/10.1145/3072959.3073687, ACM Transactions on Graphics, vol. 36, No. 4, Article 46, Jul. 2017, pp. 46:1-46:14.

Extended European Search Report for application No. 119211501.2 dated Apr. 29, 2020.

Lun et al., "3D Shape Reconstruction from Sketches via Multi-view Convolutional Networks", 2017 International Conference on 3D Vision (3DV), IEEE, DOI 10.1109/3DV.2017.00018, Oct. 10, 2017, pp. 67-77.

Liao et al., "Deep Marching Cubes: Learning Explicit Surface Representations", 2018 IEEE/CVF Conference on Computer Vision and Pattern Recognition, IEEE, DOI 10.1109/CVPR.2018.00308, Jun. 18, 2018, pp. 2916-2925.

Groueix et al., "A Papier-Mache Approach to Learning 3D Surface Generation", 2018 IEEE/CVF Conference on Computer Vision and Pattern Recognition, IEEE, DOI 10.1109/CVPR.2018.00030, Jun. 18, 2018, pp. 216-224.

Litany et al., "Deformable Shape Completion with Graph Convolutional Autoencoders", arxiv.org, Cornell University Library, 201 Olin Library Cornell University, arxiv:1712.00268v4, XP081314008, Dec. 1, 2017, pp. 1-10.

IEEE Computer Society, "IEEE Standard 754-2008 (Revision of IEEE Standard 754-1985): IEEE Standard for Floating-Point Arithmetic," The Institute of Electrical and Electronics Engineers, Inc., Aug. 29, 2008, 70 pages.

Office Action for Chinese Application No. 201911293872.0, mailed Nov. 30, 2023, 17 pages.

* cited by examiner

MESH RECONSTRUCTION USING DATA-DRIVEN PRIORS

BACKGROUND

Multiple view stereovision (MVS) techniques involve constructing three-dimensional (3D) surfaces from a number of overlapping two-dimensional (2D) images of an object. Such techniques may estimate the most likely 3D shape from the 2D images based on assumptions related to textures, viewpoints, lighting, and/or other conditions under which the images were taken. Given a set of images of an object and corresponding assumptions, MVS uses stereo correspondence among the images to reconstruct the 3D geometry of the scene captured by the images.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skilled in the art that the inventive concepts may be practiced without one or more of these specific details.

System Overview

Figure 1:
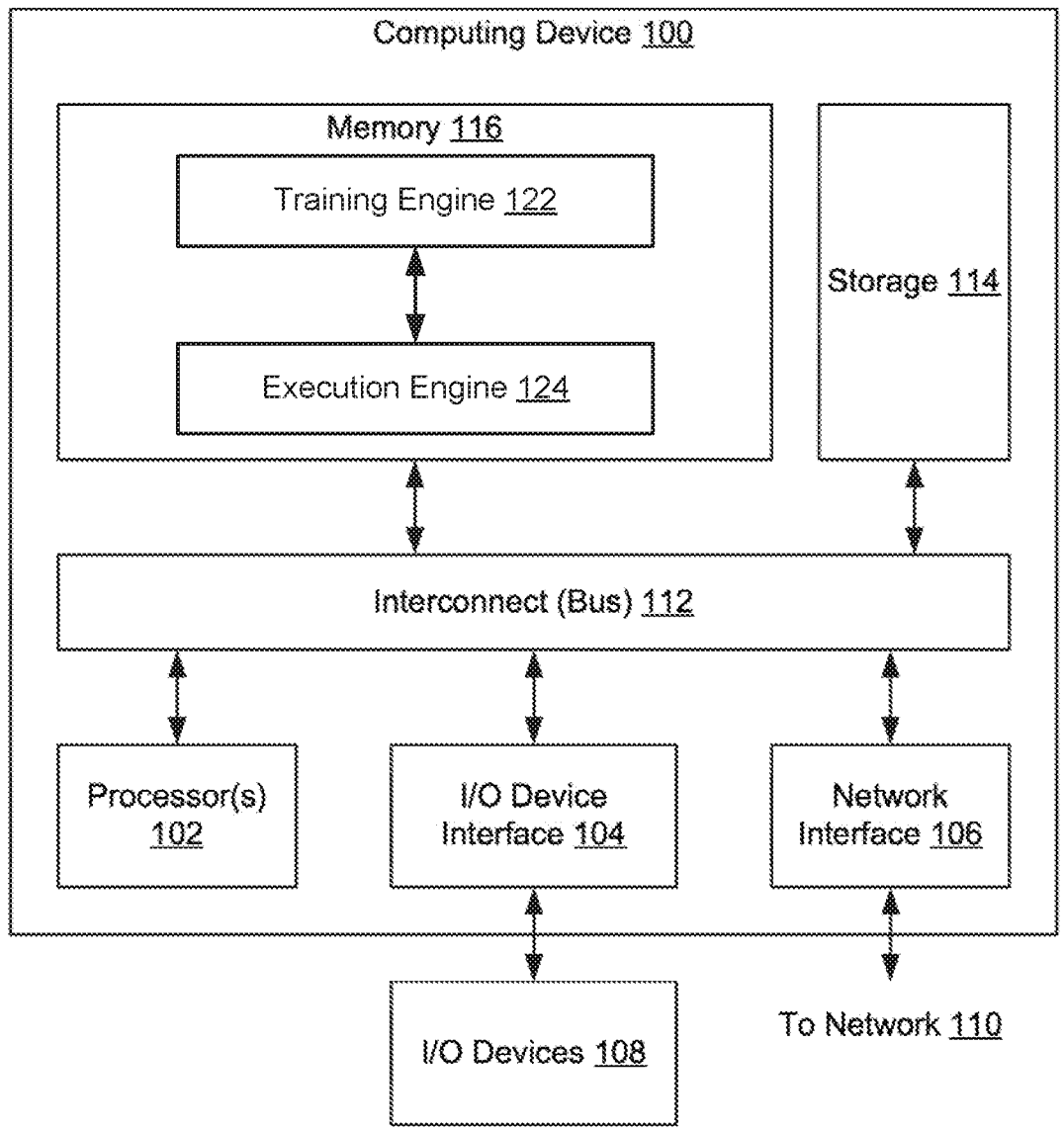
FIG. 1 is a block diagram illustrating a system configured to implement one or more aspects of various embodiments.

FIG. 1 illustrates a computing device 100 configured to implement one or more aspects of various embodiments. In one embodiment, computing device 100 may be a desktop computer, a laptop computer, a smart phone, a personal digital assistant (PDA), tablet computer, or any other type of computing device configured to receive input, process data, and optionally display images, and is suitable for practicing one or more embodiments. Computing device 100 is configured to run a training engine 122 and execution engine 124 that reside in a memory 116. It is noted that the computing device described herein is illustrative and that any other technically feasible configurations fall within the scope of the present disclosure.

In one embodiment, computing device 100 includes, without limitation, an interconnect (bus) 112 that connects one or more processing units 102, an input/output (I/O) device interface 104 coupled to one or more input/output (I/O) devices 108, memory 116, a storage 114, and a network interface 106. Processing unit(s) 102 may be any suitable processor implemented as a central processing unit (CPU), a graphics processing unit (GPU), an application-specific integrated circuit (ASIC), a field programmable gate array (FPGA), an artificial intelligence (AI) accelerator, any other type of processing unit, or a combination of different processing units, such as a CPU configured to operate in conjunction with a GPU. In general, processing unit(s) 102 may be any technically feasible hardware unit capable of processing data and/or executing software applications. Further, in the context of this disclosure, the computing elements shown in computing device 100 may correspond to a physical computing system (e.g., a system in a data center) or may be a virtual computing instance executing within a computing cloud.

In one embodiment, I/O devices 108 include devices capable of providing input, such as a keyboard, a mouse, a touch-sensitive screen, and so forth, as well as devices capable of providing output, such as a display device. Additionally, I/O devices 108 may include devices capable of both receiving input and providing output, such as a touchscreen, a universal serial bus (USB) port, and so forth. I/O devices 108 may be configured to receive various types of input from an end-user (e.g., a designer) of computing device 100, and to also provide various types of output to the end-user of computing device 100, such as displayed digital images or digital videos or text. In some embodiments, one or more of I/O devices 108 are configured to couple computing device 100 to a network 110.

In one embodiment, network 110 is any technically feasible type of communications network that allows data to be exchanged between computing device 100 and external entities or devices, such as a web server or another networked computing device. For example, network 110 may include a wide area network (WAN), a local area network (LAN), a wireless (WiFi) network, and/or the Internet, among others.

In one embodiment, storage 114 includes non-volatile storage for applications and data, and may include fixed or removable disk drives, flash memory devices, and CD-ROM, DVD-ROM, Blu-Ray, HD-DVD, or other magnetic, optical, or solid state storage devices. Training engine 122 and execution engine 124 may be stored in storage 114 and loaded into memory 116 when executed.

In one embodiment, memory 116 includes a random access memory (RAM) module, a flash memory unit, or any other type of memory unit or combination thereof. Processing unit(s) 102, I/O device interface 104, and network interface 106 are configured to read data from and write data to memory 116. Memory 116 includes various software programs that can be executed by processor(s) 102 and application data associated with said software programs, including training engine 122 and execution engine 124.

In one embodiment, training engine 122 generates one or more machine learning models for performing mesh reconstruction using data-driven priors. Each machine learning model may learn priors related to vertices, edges, corners, faces, polygons, surfaces, shapes, and/or other attributes of two-dimensional (2D) and/or three-dimensional (3D) meshes. For example, each machine learning model may include a variational autoencoder (VAE) that learns to convert input meshes into latent vectors and reconstruct the meshes from the latent vectors.

In one embodiment, execution engine 124 executes the machine learning models to perform mesh reconstruction using the mesh priors learned by the machine learning models. Continuing with the above example, execution engine 124 may input an initial value of the latent vector into the decoder of the VAE to produce an initial estimate of a mesh. Execution engine 124 may refine the mesh by selecting subsequent values of the latent vector based on geometric constraints associated with a set of image observations of an object. In various embodiments, the subsequent values of the latent vector are selected to minimize errors between the mesh and the image observations, thus allowing the mesh to approximate the shape of the object. Training engine 122 and execution engine 124 are described in further detail below with respect to FIG. 2.

Mesh Reconstruction Using Data-Driven Priors

Figure 2:
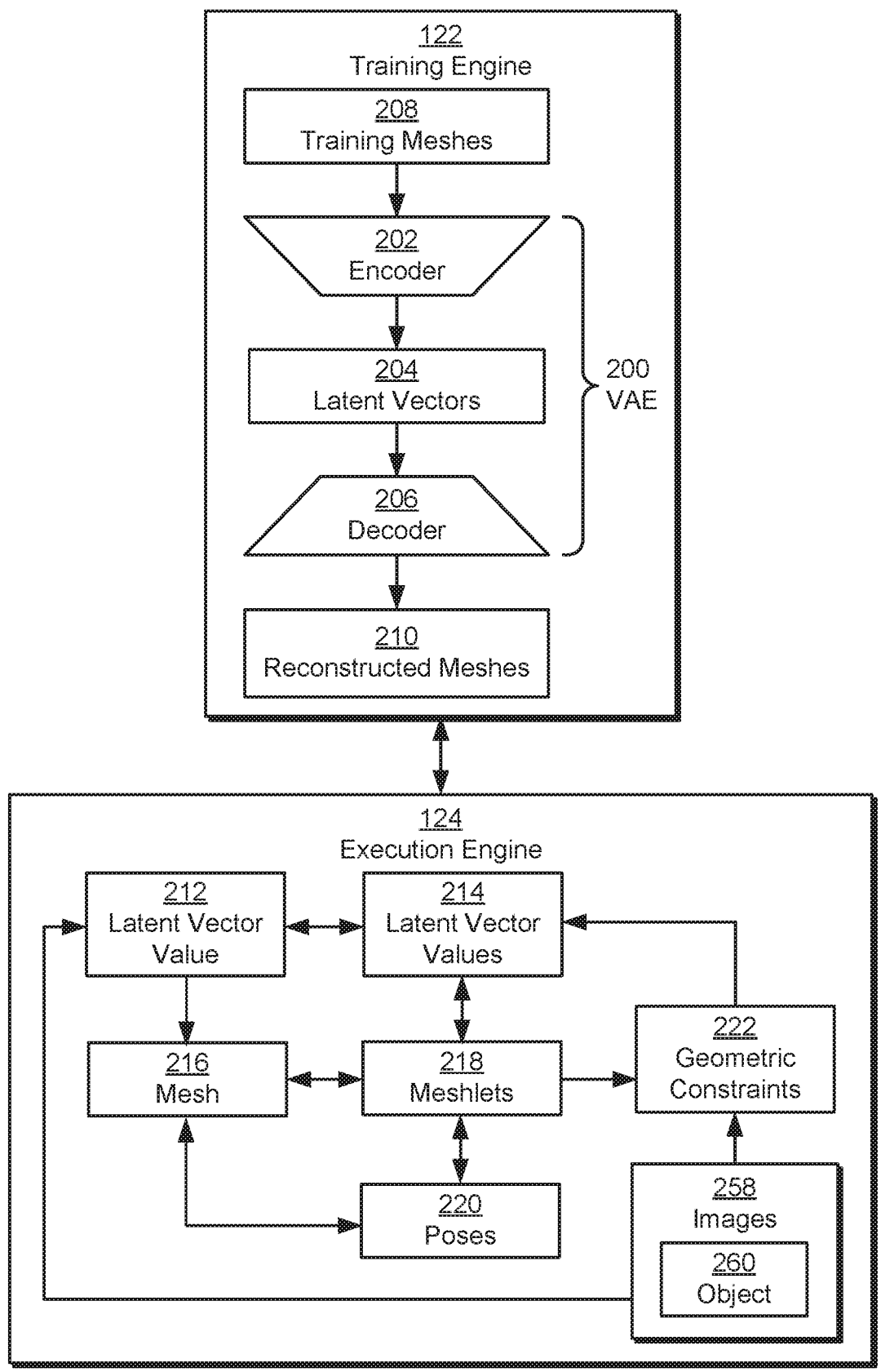
FIG. 2 is a more detailed illustration of the training engine and execution engine of FIG. 1, according to various embodiments.

FIG. 2 is a more detailed illustration of training engine 122 and execution engine 124 of FIG. 1, according to various embodiments. In the embodiment shown, training engine 122 creates a machine learning model that learns to reconstruct a set of training meshes 208 by learning and/or encoding priors associated with training meshes 208. For example, the machine learning model may learn, from training meshes 208, a number of "basic types" related to vertices, edges, corners, faces, triangles, polygons, surfaces, shapes, and/or other attributes of 2D and/or 3D meshes.

In one embodiment, execution engine 124 uses the machine learning model to perform inverse rendering of an object 260 captured in a set of images 258 into a corresponding mesh 216. For example, execution engine 124 may use the machine learning model to estimate a 3D mesh 216 of object 260 from 2D images 258 that capture multiple views and/or multiple illuminations of object 260. Thus, images 258 may represent ground truth image observations of object 260.

Machine learning models created by training engine 122 can include any technically feasible form of machine learning model. For example, the machine learning models may include recurrent neural networks (RNNs), convolutional neural networks (CNNs), deep neural networks (DNNs), deep convolutional networks (DCNs), deep belief networks (DBNs), restricted Boltzmann machines (RBMs), long-short-term memory (LSTM) units, gated recurrent units (GRUs), generative adversarial networks (GANs), self-organizing maps (SOMs), and/or other types of artificial neural networks or components of artificial neural networks. In another example, the machine learning models may include functionality to perform clustering, principal component analysis (PCA), latent semantic analysis (LSA), Word2vec, and/or another unsupervised learning technique. In a third example, the machine learning models may include regression models, support vector machines, decision trees, random forests, gradient boosted trees, naïve Bayes classifiers, Bayesian networks, hierarchical models, and/or ensemble models.

In some embodiments, the machine learning model created by training engine 122 includes a VAE 200, which includes an encoder 202 and a decoder 206. For example, training engine 122 may input 2D and/or 3D training meshes 208 into encoder 202, and encoder 202 may "encode" training meshes 208 into latent vectors 204 (e.g., scalars, geometric vectors, tensors, and/or other geometric objects) within a latent space of lower dimensionality than training meshes 208. A decoder 206 in VAE 200 may "decode" latent vectors 204 into higher dimensionality reconstructed meshes 210 that substantially reproduce training meshes 208.

In various embodiments, training meshes 208 may include collections of 2D and/or 3D points, representations of edges between pairs of points, and/or representations of triangles, polygons, and/or other shapes formed by the points and edges. Edges and/or shapes in training meshes 208 may be encoded in orderings of the points within training meshes 208. For example, a 2D mesh may be parameterized as an ordered set of points, with each adjacent pair of points in the ordered set connected by an edge between the points. In another example, a 3D mesh may be parameterized using one or more triangle strips, triangle fans, and/or other representations of triangles within the mesh.

In one or more embodiments, training engine 122 configures VAE 200 to encode training meshes 208 in a way that is unaffected by the parameterization of training meshes 208 inputted into encoder 202. In these embodiments, training engine 122 inputs multiple ordered sets of points in each training mesh into encoder 202 and standardizes the output of encoder 202 from the multiple ordered sets of points. Thus, training engine 122 may decouple the parameterizations of training meshes 208 from the latent space of VAE 200 into which training meshes 208 are encoded.

In one embodiment, ordered sets of points inputted into encoder 202 may include all possible orderings of points in a training mesh, a randomly selected subset of possible orderings of points in the training mesh, and/or any other combination of orderings of points in the training mesh. For example, training engine 122 may generate different ordered sets of points in a 2D mesh of a polygon by selecting different vertices of the polygon and/or various points along edges between the vertices as starting points in the ordered sets. In another example, training engine 122 may generate two different orderings of points in the 2D mesh from the same starting point by traversing the mesh in the clockwise and counterclockwise directions beginning at the starting point.

In one embodiment, training engine 122 trains a different encoder that is not in VAE 200 to generate intermediate representations of ordered sets of points and/or other parameterizations of training meshes 208. In one embodiment, training engine 122 averages and/or otherwise aggregates the intermediate representations into a standardized value in the latent space, such that the standardized value defines the mean and standard deviation from which the output of encoder 202 is sampled.

In one embodiment, training engine 122 inputs the output sampled using the standardized value into decoder 206 to obtain reconstructed meshes 210 as output of decoder 206. Training engine 122 also computes an error between each training mesh and a corresponding reconstructed mesh as the minimum error between an ordering of points in the training mesh inputted into encoder 202 and the outputted ordering of points from decoder 206. For example, training engine 122 may compute the minimum error based on the intersection of points in the training mesh and reconstructed mesh, a Chamfer distance between the training mesh and reconstructed mesh, an earth mover's distance, and/or another measure of distance, similarity, and/or dissimilarity between the points, edges, shapes, and/or other attributes of the training mesh and reconstructed mesh.

In one embodiment, training engine 122 uses the error between each training mesh and the corresponding reconstructed mesh to update the parameters of encoder 202 and decoder 206. For example, training engine 122 may backpropagate the error across the layers and/or parameters of decoder 206 so that decoder 206 learns to decode the reconstructed mesh from the sampled output of encoder 202. Training engine 122 may also backpropagate the error across the layers and/or parameters of encoder 202 so that encoder 202 learns to produce a consistent latent vector representation (e.g., mean and standard deviation vectors) for different orderings of points in the corresponding training mesh.

In one embodiment, training engine 122 trains decoder 206 to generate reconstructed meshes 210 from training meshes 208 at varying resolutions until a desired mesh resolution is reached. For example, decoder 206 may include a number of neural network layers, with each layer producing a reconstructed mesh with a higher number of vertices than the previous layer (e.g., by adding vertices to the centers of edges and/or polygon faces in the mesh from the previous layer). In one embodiment, during training of decoder 206, training engine 122 may compare a coarse reconstructed mesh produced by the first layer of decoder 206 with the corresponding training mesh and update parameters of the first layer to reduce the error between the vertices of the reconstructed mesh and corresponding vertices of the training mesh. Training engine 122 may repeat the process with subsequent layers of decoder 206, which upsample the reconstructed mesh from the previous layer, until the output layer of decoder 206 and/or the desired reconstructed mesh resolution is reached.

By performing a "coarse to fine" autoencoding of training meshes 208, training engine 122 may allow the coarse mesh from the first layer of decoder 206 to be defined in a given reference coordinate frame and subsequent refinements to the coarse mesh from subsequent layers of decoder 206 to be defined in relative terms with respect to the coarse mesh. As a result, the refinements and, in turn, most of the reconstructed mesh may be independent of the reference frame or global pose of the object. This allows decoder 206 to learn variations in reference coordinate system across meshes more easily and/or potentially omit estimation of global pose during generation of reconstructed meshes 210.

In the embodiment shown, execution engine 124 executes one or more portions of VAE 200 to produce a mesh 216 of an object 260 from a latent vector value 212 of a vector in the latent space of VAE 200 and images 258 of object 260. For example, execution engine 124 may input latent vector value 212 into decoder 206 to generate mesh 216 as a decoded representation of the vector.

More specifically, in one embodiment, execution engine 124 varies latent vector value 212 inputted into decoder 206 with fixed parameters to generate mesh 216 so that mesh 216 reproduces an object 260 captured in a set of images 258. In one or more embodiments, images 258 are associated with a set of assumptions that allow mesh 216 to be reconstructed base on images 258. For example, images 258 may be associated with known camera poses that generate multiple views of object 260, multiple lighting conditions that allow object 260 to be captured under different illuminations, and/or Lambertian surfaces on object 260 that have isotropic luminance (i.e., surfaces with uniform brightness from any direction of view).

In one embodiment, execution engine 124 initially selects latent vector value 212 based on one or more criteria. For example, execution engine 124 may randomly select the initial latent vector value 212 and/or set the initial latent vector value 212 to a default latent vector value associated with decoder 206. In another example, execution engine 124 may set the initial latent vector value 212 based on sparse features extracted from 2D images 258 (e.g., features extracted using a scale-invariant feature transform (SIFT) technique, a corner detection technique, and/or another image feature detection technique). Execution engine 124 may use the sparse features to generate the initial latent vector value 212 by estimating 3D locations of the sparse features based on the assumptions associated with images 258, inputting the locations into encoder 202, and obtaining the initial latent vector value 212 based on output from encoder 202.

In one embodiment, execution engine 124 uses assumptions associated with images 258 to determine geometric constraints 222 associated with object 260, which may include constraints related to the shape and/or geometry of object 260. Execution engine 124 also refines mesh 216 by updating latent vector value 212 based on mesh 216 and geometric constraints 222.

In one embodiment, execution engine 124 uses geometric constraints 222 to calculate one or more errors associated with mesh 216 and updates latent vector value 212 based on gradients associated with the errors. For example, execution engine 124 may use known camera poses and/or lighting conditions associated with images 258 to back-project an image from a first camera to mesh 216 and project a warped image back to a second camera. Execution engine 124 may calculate a photometric error and/or silhouette error between the warped image and a corresponding image observation of object 260 from images 258 (e.g., an image of object 260 taken from the second camera's location and/or under the same lighting conditions used to produce the warped image). Execution engine 124 may use gradients associated with the photometric and/or silhouette error to modify latent vector value 212 so that mesh 216 better approximates the shape of object 260. Execution engine 124 may also repeat the process, thus iteratively updating latent vector value 212 to search the latent space associated with VAE 200 and using decoder 206 to generate a more accurate mesh 216 from latent vector value 212 until mesh 216 is a substantially accurate representation of object 260.

In one embodiment, execution engine 124 generates warped images of mesh 216 for comparison to ground truth images 258 of object 260 by casting a ray from the first camera toward mesh 216, selecting the ray's closest point of intersection on mesh 216, and casting another ray from the point of intersection to the second camera. During this process, a face of mesh 216 may be represented as a binary indicator function in an image, where the face is "visible" in the image at locations where rays from the corresponding camera intersect with the face and invisible otherwise. Because the indicator function is binary and includes an abrupt change from "seen" pixels of the face to "unseen" pixels elsewhere, the image may be non-differentiable, which may interfere with generating gradients that are used to update latent vector value 212.

In one or more embodiments, execution engine 124 generates images of mesh 216 using differentiable indicator functions that smooth the transition between visible and invisible portions of faces in mesh 216. For example, a face in mesh 216 may have an indicator function that shows the face as "visible" wherever a ray from a camera intersects the face, invisible where a ray from the camera does not intersect the face, and smoothly but quickly transitioning between visible and invisible in the vicinity of the border between the two.

When mesh 216 is generated from a single latent vector value 212 inputted into decoder, decoder 206 may be required to learn the prior for the entire object 260. As a result, execution engine 124 may be capable of generating mesh 216 as an accurate reconstruction of object 260 only when object 260 belongs to the distribution of training meshes 208 used to produce VAE 200.

In one or more embodiments, execution engine 124 reduces the number and/or complexity of mesh priors learned by decoder 206 by dividing mesh 216 into multiple smaller meshlets 218 that represent different portions of mesh 218. For example, execution engine 124 may generate each meshlet as one or more polygons, surfaces, and/or shapes in mesh 216. Each meshlet may be defined using more basic priors than a much larger mesh 216 of object 260, which may allow the priors to be generalized to a greater variety of objects and/or shapes. Each meshlet may also encompass a different part of mesh 218, and meshlets 218 may be combined to produce mesh 218.

As with generation of mesh 216 from a single latent vector value 212 inputted into decoder 206, in one embodiment, execution engine 124 inputs multiple latent vector values 214 into decoder 206 to generate multiple corresponding meshlets 218 as output from decoder 206. Execution engine 124 may similarly update latent vector values 214 to enforce subsets of geometric constraints 222 associated with individual meshlets 218 and/or reduce errors between meshlets 218 and the corresponding portions of object 260. For example, execution engine 124 may map a meshlet to a portion of object 260 and use images 258 containing the portion to determine geometric constraints 222 associated with the portion. Execution engine 124 may use geometric constraints 222 to generate errors between the meshlet and images 258 and perform gradient descent on the latent vector value used to produce the meshlet based on the errors.

In the embodiment shown, meshlets 218 are additionally associated with poses 220 that project meshlets 218 back into mesh 216. For example, the shape and/or geometry of each meshlet may be generated from a point in the latent space of VAE 200. Each meshlet may also be associated with one or more custom poses 220 (e.g., one or more rotations, translations, and/or other transformations) that align the global pose of images 258 and/or mesh 216 with the canonical pose of the meshlet learned by decoder 206.

In one embodiment, execution engine 124 uses gradients and/or errors associated with geometric constraints 222 to update both latent vector values 214 of meshlets 218 and poses 220 that transform meshlets 218 into their corresponding positions and/or orientations in mesh 216. For example, object 260 may include a rectangular surface with four right-angle corners. During reconstruction of mesh 216 for object 260, execution engine 124 may use geometric constraints 222 to identify a value in the latent space associated with VAE 200 that produces a meshlet with a right-angle corner and learn four different poses 220 that map the meshlet to the four corners of the rectangular surface.

In one embodiment, execution engine 124 iteratively increases a resolution of meshlets 218 to meet geometric constraints 222. For example, execution engine 124 may use a first layer of decoder 206 to generate an initial coarse mesh 216 that matches low-resolution images 258 of object 260. Execution engine 124 may use subsequent layers of decoder 206 to upsample the coarse mesh 216 into increasingly small and numerous meshlets 218. At each layer of decoder 206, execution engine 124 may perform gradient descent on latent vector values 214 used to produce meshlets 218 and poses 220 of meshlets 218 with respect to the coarse mesh until the desired mesh 216 and/or meshlet resolution is reached.

In one embodiment, execution engine 124 reconstructs mesh 216 from meshlets 218 and the corresponding poses 220 and stores the reconstructed mesh 216 in association with object 260. For example, execution engine 124 may apply poses 220 to the corresponding meshlets 218 to map the points in the canonical poses of meshlets 218 to their locations in mesh 216. Execution engine 124 may then render the completed mesh 216 and/or store the points in mesh 216 under an identifier for object 260, with images 258 of object 260, and/or with other metadata for object 260.

Figure 3:
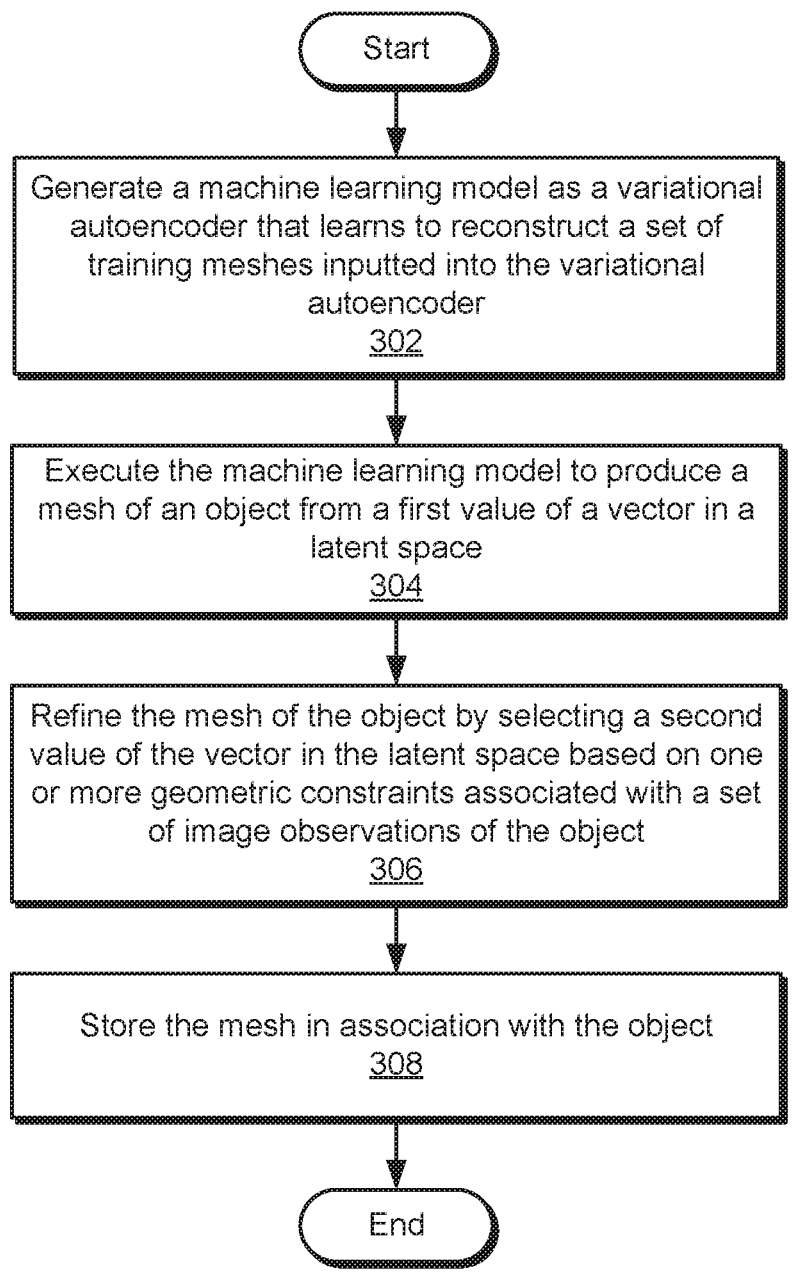
FIG. 3 is a flow diagram of method steps for performing mesh reconstruction using data-driven priors, according to various embodiments.

FIG. 3 is a flow diagram of method steps for performing mesh reconstruction using data-driven priors, according to various embodiments. Although the method steps are described in conjunction with the systems of FIGS. 1 and 2, persons skilled in the art will understand that any system configured to perform the method steps in any order falls within the scope of the present disclosure.

As shown, training engine 122 generates 302 a machine learning model as a VAE that learns to reconstruct a set of training meshes inputted into the VAE, as described in further detail below with respect to FIG. 4. In various embodiments, the training meshes may include 2D and/or 3D meshes and/or meshlets.

Next, execution engine 124 executes 304 the machine learning model to produce a mesh of an object from a first value of a vector in a latent space. For example, execution engine 124 may select the first value of the vector as a random value, a default value, a value that is based on a set of image observations of the object, and/or a value that is based on sparse features extracted from the image observations. Execution engine 124 may input the first value into a decoder in the VAE and obtain the mesh as output from the decoder. The similarity of the mesh to the object may be affected by the criteria used to select the first value of the vector (e.g., a first value of the vector that reflects sparse features from the image observations is likely to produce a mesh that is more similar to the object than a first value of the vector that is selected randomly).

Execution engine 124 refines 306 the mesh of the object by selecting a second value of the vector in the latent space based on one or more geometric constraints associated with the image observations of the object. For example, execution engine 124 may use known camera poses and/or lighting conditions under which the image observations were made to project and/or back-project warped images of the mesh. Execution engine 124 may also calculate photometric and/or silhouette errors between the warped images of the mesh and corresponding image observations (e.g., image observations made under the same camera poses and/or lighting conditions). Execution engine 124 may then use gradients associated with the errors and constant parameters of the machine learning model to update the value of the vector.

In another example, execution engine 124 may project and/or divide the mesh into a set of meshlets that represent different portions of the mesh. For each meshlet, execution engine 124 may select a value of the vector in the latent space to learn a prior for a portion of the mesh represented by the meshlet. Execution engine 124 may also learn a custom pose of the meshlet that maps the meshlet into a position and/or orientation within the mesh and/or aligns a global pose of the image observations with the canonical pose of the meshlet learned by the machine learning model. Execution engine 124 may then reconstruct the mesh from the set of meshlets by using the custom poses of the meshlets to map points in the meshlets into the reference system of the mesh.

Finally, execution engine 124 stores 308 the mesh in association with the object. For example, execution engine 124 may store the points in mesh 216 under an identifier for the object, with images of the object, and/or with other metadata for the object.

Figure 4:
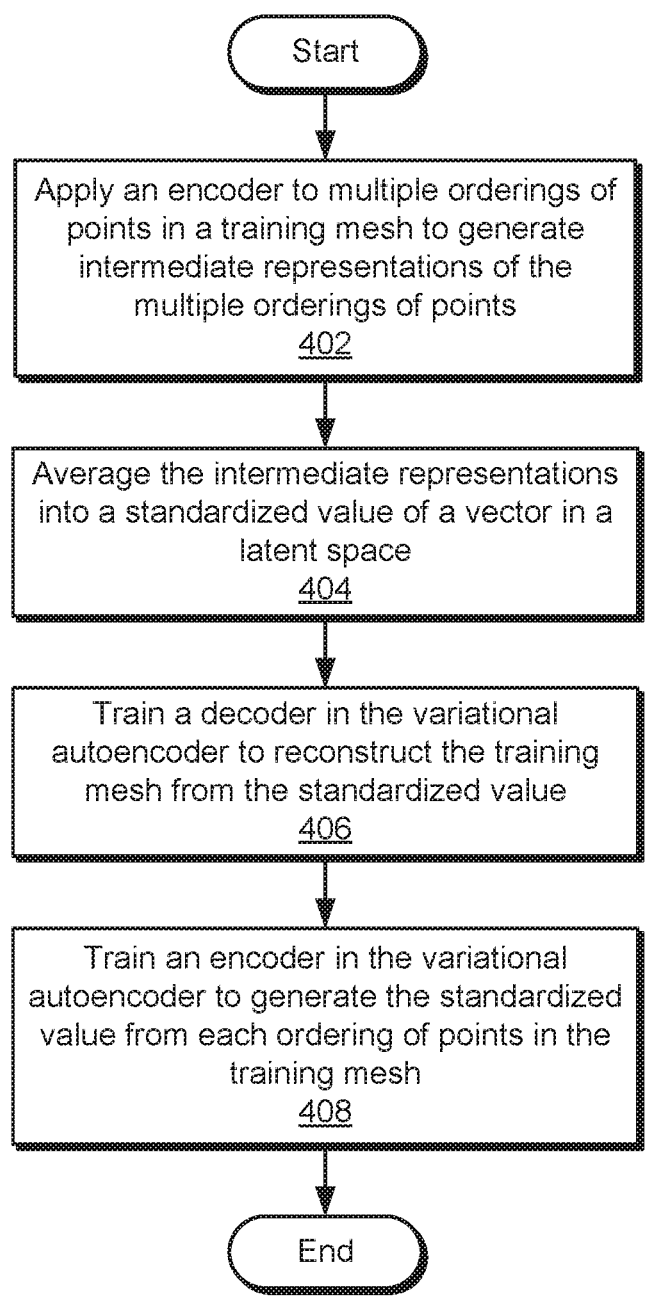
FIG. 4 is a flow diagram of method steps for training a machine learning model to learn data-driven mesh priors, according to various embodiments.

FIG. 4 is a flow diagram of method steps for training a machine learning model to learn data-driven mesh priors, according to various embodiments. Although the method steps are described in conjunction with the systems of FIGS. 1 and 2, persons skilled in the art will understand that any system configured to perform the method steps in any order falls within the scope of the present disclosure.

As shown, training engine 122 applies 402 an encoder to multiple orderings of points in a training mesh to generate intermediate representations of the multiple orderings of points. For example, training engine 122 may select a random subset of all possible orderings of points in the training mesh as input to the encoder. The encoder may "encode" each ordering of points into a vector in a latent space.

Next, training engine 122 averages 404 the intermediate representations into a standardized value of a vector in the latent space. The standardized value may define the mean and standard deviation vectors outputted by an encoder in a VAE.

Training engine 122 then trains 406 a decoder in the VAE to reconstruct the training mesh from the standardized value. Training engine 122 also optionally trains 408 an encoder in the VAE to generate the standardized value from each ordering of points in the training mesh. For example, training engine 122 may calculate an error between the reconstructed mesh and the training mesh as the minimum error between an ordering of points in the training mesh inputted into the encoder and the outputted ordering of points from the decoder. The error may be based on an intersection of points between the training mesh and reconstructed mesh, a distance metric between the training mesh and reconstructed mesh, and/or other measures of similarity or dissimilarity between the training mesh and reconstructed mesh. Training engine 122 may backpropagate the error across the layers and/or parameters of the decoder so that the decoder learns to reconstruct the training mesh based on the standardized value. Training engine 122 may also backpropagate the error across the layers and/or parameters of the encoder so that the encoder learns to output the standardized value for different orderings of points in the corresponding training mesh.

Example Hardware Architecture

Figure 5:
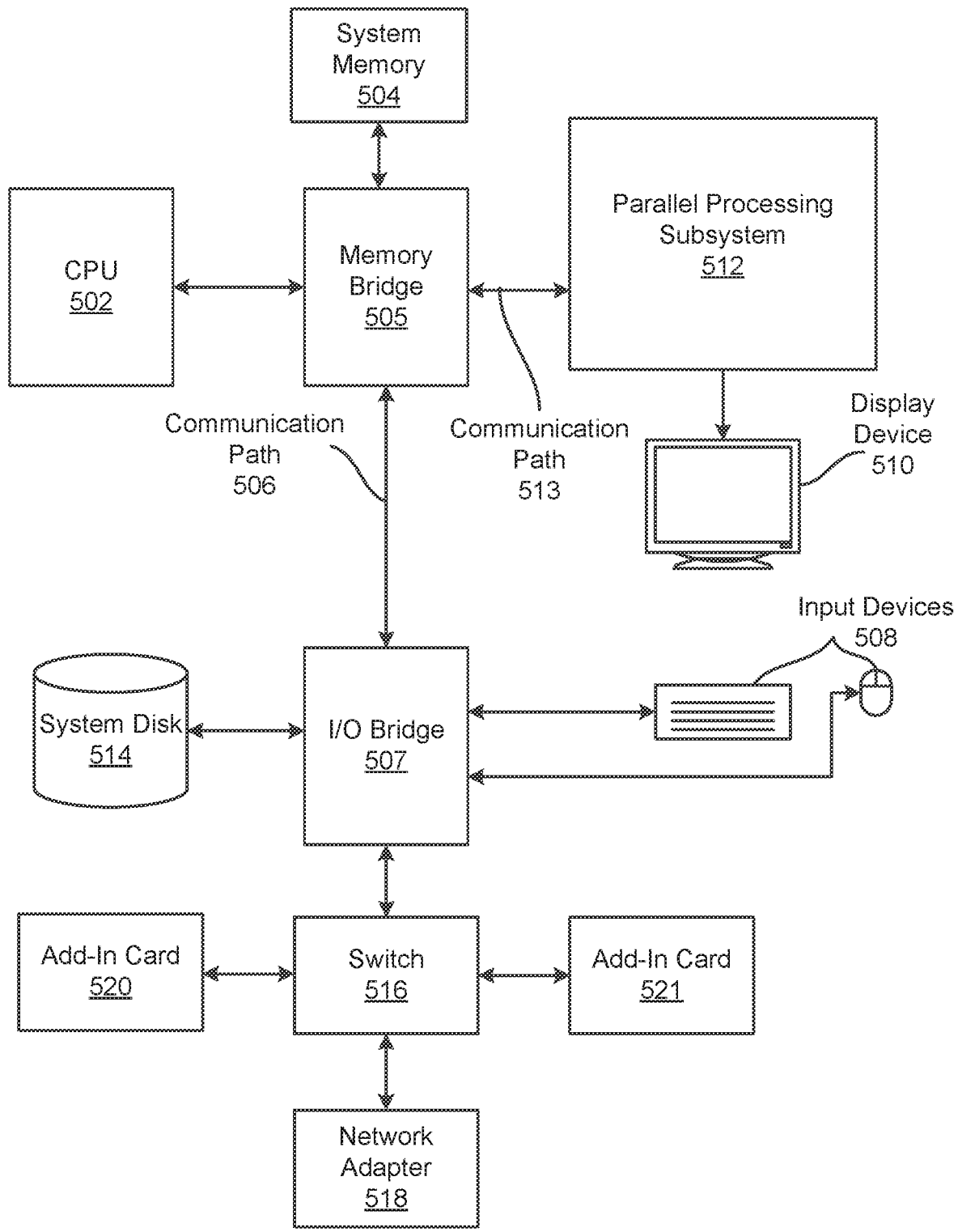
FIG. 5 is a block diagram illustrating a computer system configured to implement one or more aspects of various embodiments.

FIG. 5 is a block diagram illustrating a computer system 500 configured to implement one or more aspects of various embodiments. In some embodiments, computer system 500 is a server machine operating in a data center or a cloud computing environment that provides scalable computing resources as a service over a network. In some embodiments, computer system 500 implements the functionality of computing device 100 of FIG. 1.

In various embodiments, computer system 500 includes, without limitation, a central processing unit (CPU) 502 and a system memory 504 coupled to a parallel processing subsystem 512 via a memory bridge 505 and a communication path 513. Memory bridge 505 is further coupled to an I/O (input/output) bridge 507 via a communication path 506, and I/O bridge 507 is, in turn, coupled to a switch 516.

In one embodiment, I/O bridge 507 is configured to receive user input information from optional input devices 508, such as a keyboard or a mouse, and forward the input information to CPU 502 for processing via communication path 506 and memory bridge 505. In some embodiments, computer system 500 may be a server machine in a cloud computing environment. In such embodiments, computer system 500 may not have input devices 508. Instead, computer system 500 may receive equivalent input information by receiving commands in the form of messages transmitted over a network and received via the network adapter 518. In one embodiment, switch 516 is configured to provide connections between I/O bridge 507 and other components of the computer system 500, such as a network adapter 518 and various add-in cards 520 and 521.

In one embodiment, I/O bridge 507 is coupled to a system disk 514 that may be configured to store content and applications and data for use by CPU 502 and parallel processing subsystem 512. In one embodiment, system disk 514 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. In various embodiments, other components, such as universal serial bus or other port connections, compact disc drives, digital versatile disc drives, film recording devices, and the like, may be connected to I/O bridge 507 as well.

In various embodiments, memory bridge 505 may be a Northbridge chip, and I/O bridge 507 may be a Southbridge chip. In addition, communication paths 506 and 513, as well as other communication paths within computer system 500, may be implemented using any technically suitable protocols, including, without limitation, AGP (Accelerated Graphics Port), HyperTransport, or any other bus or point-to-point communication protocol known in the art.

In some embodiments, parallel processing subsystem 512 comprises a graphics subsystem that delivers pixels to an optional display device 510 that may be any conventional cathode ray tube, liquid crystal display, light-emitting diode display, or the like. In such embodiments, the parallel processing subsystem 512 incorporates circuitry optimized for graphics and video processing, including, for example, video output circuitry. As described in greater detail below in conjunction with FIGS. 6 and 7, such circuitry may be incorporated across one or more parallel processing units (PPUs), also referred to herein as parallel processors, included within parallel processing subsystem 512.

In other embodiments, the parallel processing subsystem 512 incorporates circuitry optimized for general purpose and/or compute processing. Again, such circuitry may be incorporated across one or more PPUs included within parallel processing subsystem 512 that are configured to perform such general purpose and/or compute operations. In yet other embodiments, the one or more PPUs included within parallel processing subsystem 512 may be configured to perform graphics processing, general purpose processing, and compute processing operations. System memory 504 includes at least one device driver configured to manage the processing operations of the one or more PPUs within parallel processing subsystem 512.

In various embodiments, parallel processing subsystem 512 may be integrated with one or more of the other elements of FIG. 5 to form a single system. For example, parallel processing subsystem 512 may be integrated with CPU 502 and other connection circuitry on a single chip to form a system on chip (SoC).

In one embodiment, CPU 502 is the master processor of computer system 500, controlling and coordinating operations of other system components. In one embodiment, CPU 502 issues commands that control the operation of PPUs. In some embodiments, communication path 513 is a PCI Express link, in which dedicated lanes are allocated to each PPU, as is known in the art. Other communication paths may also be used. PPU advantageously implements a highly parallel processing architecture. A PPU may be provided with any amount of local parallel processing memory (PP memory).

It will be appreciated that the system shown herein is illustrative and that variations and modifications are possible. The connection topology, including the number and arrangement of bridges, the number of CPUs 502, and the number of parallel processing subsystems 512, may be modified as desired. For example, in some embodiments, system memory 504 could be connected to CPU 502 directly rather than through memory bridge 505, and other devices would communicate with system memory 504 via memory bridge 505 and CPU 502. In other embodiments, parallel processing subsystem 512 may be connected to I/O bridge 507 or directly to CPU 502, rather than to memory bridge 505. In still other embodiments, I/O bridge 507 and memory bridge 505 may be integrated into a single chip instead of existing as one or more discrete devices. Lastly, in certain embodiments, one or more components shown in FIG. 5 may not be present. For example, switch 516 could be eliminated, and network adapter 518 and add-in cards 520, 521 would connect directly to I/O bridge 507.

Figure 6:
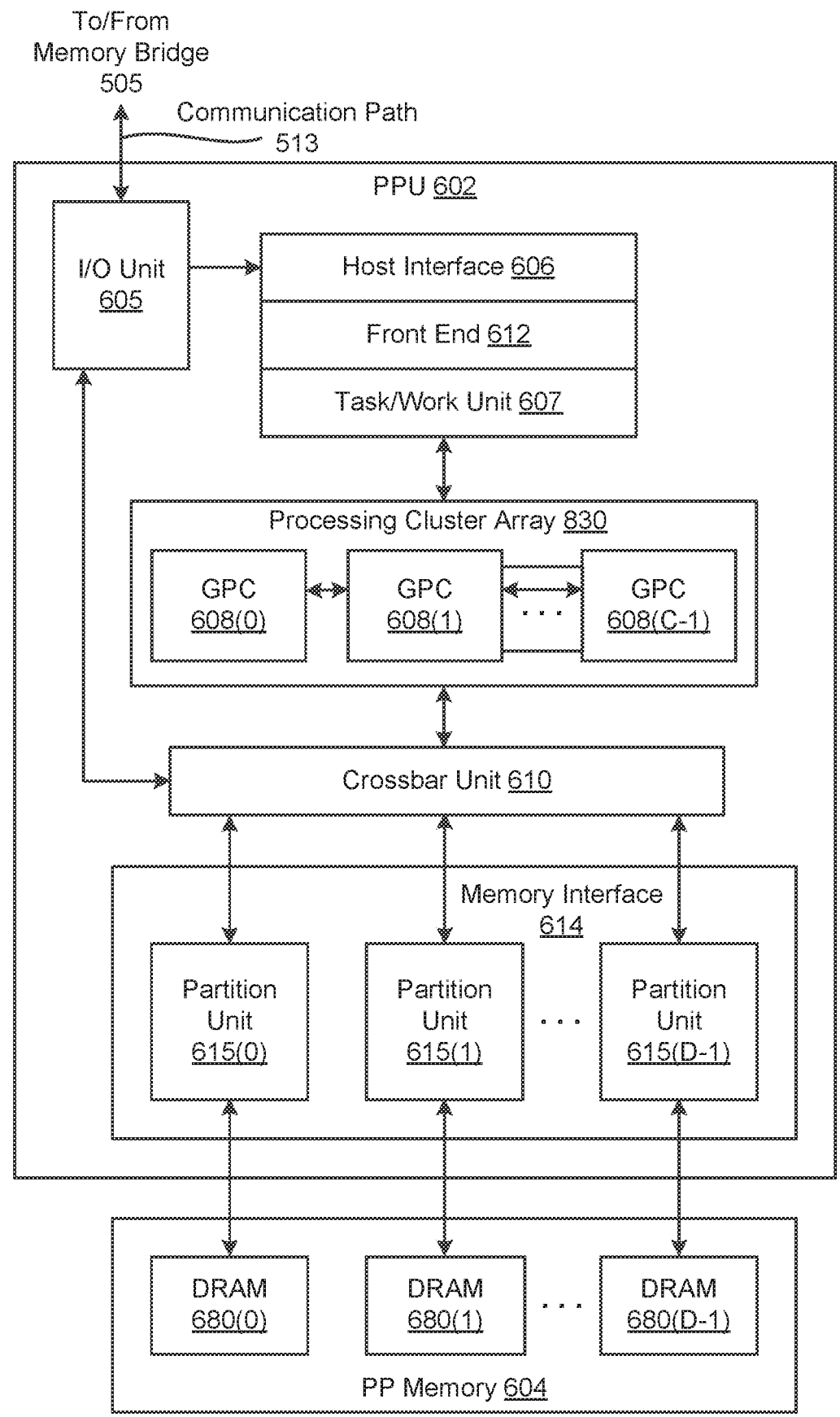
FIG. 6 is a block diagram of a parallel processing unit (PPU) included in the parallel processing subsystem of FIG. 5, according to various embodiments.

FIG. 6 is a block diagram of a parallel processing unit (PPU) 602 included in the parallel processing subsystem 512 of FIG. 5, according to various embodiments. Although FIG. 6 depicts one PPU 602, as indicated above, parallel processing subsystem 512 may include any number of PPUs 602. As shown, PPU 602 is coupled to a local parallel processing (PP) memory 604. PPU 602 and PP memory 604 may be implemented using one or more integrated circuit devices, such as programmable processors, application specific integrated circuits (ASICs), or memory devices, or in any other technically feasible fashion.

In some embodiments, PPU 602 comprises a graphics processing unit (GPU) that may be configured to implement a graphics rendering pipeline to perform various operations related to generating pixel data based on graphics data supplied by CPU 502 and/or system memory 504. When processing graphics data, PP memory 604 can be used as graphics memory that stores one or more conventional frame buffers and, if needed, one or more other render targets as well. Among other things, PP memory 604 may be used to store and update pixel data and deliver final pixel data or display frames to an optional display device 510 for display. In some embodiments, PPU 602 also may be configured for general-purpose processing and compute operations. In some embodiments, computer system 500 may be a server machine in a cloud computing environment. In such embodiments, computer system 500 may not have a display device 510. Instead, computer system 500 may generate equivalent output information by transmitting commands in the form of messages over a network via the network adapter 518.

In some embodiments, CPU 502 is the master processor of computer system 500, controlling and coordinating operations of other system components. In one embodiment, CPU 502 issues commands that control the operation of PPU 602. In some embodiments, CPU 502 writes a stream of commands for PPU 602 to a data structure (not explicitly shown in either FIG. 5 or FIG. 6) that may be located in system memory 504, PP memory 604, or another storage location accessible to both CPU 502 and PPU 602. A pointer to the data structure is written to a command queue, also referred to herein as a pushbuffer, to initiate processing of the stream of commands in the data structure. In one embodiment, the PPU 602 reads command streams from the command queue and then executes commands asynchronously relative to the operation of CPU 502. In embodiments where multiple pushbuffers are generated, execution priorities may be specified for each pushbuffer by an application program via device driver to control scheduling of the different pushbuffers.

In one embodiment, PPU 602 includes an I/O (input/output) unit 605 that communicates with the rest of computer system 500 via the communication path 513 and memory bridge 505. In one embodiment, I/O unit 605 generates packets (or other signals) for transmission on communication path 513 and also receives all incoming packets (or other signals) from communication path 513, directing the incoming packets to appropriate components of PPU 602. For example, commands related to processing tasks may be directed to a host interface 606, while commands related to memory operations (e.g., reading from or writing to PP memory 604) may be directed to a crossbar unit 610. In one embodiment, host interface 606 reads each command queue and transmits the command stream stored in the command queue to a front end 612.

As mentioned above in conjunction with FIG. 5, the connection of PPU 602 to the rest of computer system 500 may be varied. In some embodiments, parallel processing subsystem 512, which includes at least one PPU 602, is implemented as an add-in card that can be inserted into an expansion slot of computer system 500. In other embodiments, PPU 602 can be integrated on a single chip with a bus bridge, such as memory bridge 505 or I/O bridge 507. Again, in still other embodiments, some or all of the elements of PPU 602 may be included along with CPU 502 in a single integrated circuit or system of chip (SoC).

In one embodiment, front end 612 transmits processing tasks received from host interface 606 to a work distribution unit (not shown) within task/work unit 607. In one embodiment, the work distribution unit receives pointers to processing tasks that are encoded as task metadata (TMD) and stored in memory. The pointers to TMDs are included in a command stream that is stored as a command queue and received by the front end unit 612 from the host interface 606. Processing tasks that may be encoded as TMDs include indices associated with the data to be processed as well as state parameters and commands that define how the data is to be processed. For example, the state parameters and commands could define the program to be executed on the data. Also for example, the TMD could specify the number and configuration of the set of CTAs. Generally, each TMD corresponds to one task. The task/work unit 607 receives tasks from the front end 612 and ensures that GPCs 608 are configured to a valid state before the processing task specified by each one of the TMDs is initiated. A priority may be specified for each TMD that is used to schedule the execution of the processing task. Processing tasks also may be received from the processing cluster array 630. Optionally, the TMD may include a parameter that controls whether the TMD is added to the head or the tail of a list of processing tasks (or to a list of pointers to the processing tasks), thereby providing another level of control over execution priority.

In one embodiment, PPU 602 implements a highly parallel processing architecture based on a processing cluster array 630 that includes a set of C general processing clusters (GPCs) 608, where C≥1. Each GPC 608 is capable of executing a large number (e.g., hundreds or thousands) of threads concurrently, where each thread is an instance of a program. In various applications, different GPCs 608 may be allocated for processing different types of programs or for performing different types of computations. The allocation of GPCs 608 may vary depending on the workload arising for each type of program or computation.

In one embodiment, memory interface 614 includes a set of D of partition units 615, where D≥1. Each partition unit 615 is coupled to one or more dynamic random access memories (DRAMs) 620 residing within PPM memory 604. In some embodiments, the number of partition units 615 equals the number of DRAMs 620, and each partition unit 615 is coupled to a different DRAM 620. In other embodiments, the number of partition units 615 may be different than the number of DRAMs 620. Persons of ordinary skill in the art will appreciate that a DRAM 620 may be replaced with any other technically suitable storage device. In operation, various render targets, such as texture maps and frame buffers, may be stored across DRAMs 620, allowing partition units 615 to write portions of each render target in parallel to efficiently use the available bandwidth of PP memory 604.

In one embodiment, a given GPC 608 may process data to be written to any of the DRAMs 620 within PP memory 604. In one embodiment, crossbar unit 610 is configured to route the output of each GPC 608 to the input of any partition unit 615 or to any other GPC 608 for further processing. GPCs 608 communicate with memory interface 614 via crossbar unit 610 to read from or write to various DRAMs 620. In some embodiments, crossbar unit 610 has a connection to I/O unit 605, in addition to a connection to PP memory 604 via memory interface 614, thereby enabling the processing cores within the different GPCs 608 to communicate with system memory 504 or other memory not local to PPU 602. In the embodiment of FIG. 6, crossbar unit 610 is directly connected with I/O unit 605. In various embodiments, crossbar unit 610 may use virtual channels to separate traffic streams between the GPCs 608 and partition units 615.

In one embodiment, GPCs 608 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 602 is configured to transfer data from system memory 504 and/or PP memory 604 to one or more on-chip memory units, process the data, and write result data back to system memory 504 and/or PP memory 604. The result data may then be accessed by other system components, including CPU 502, another PPU 602 within parallel processing subsystem 512, or another parallel processing subsystem 512 within computer system 500.

In one embodiment, any number of PPUs 602 may be included in a parallel processing subsystem 512. For example, multiple PPUs 602 may be provided on a single add-in card, or multiple add-in cards may be connected to communication path 513, or one or more of PPUs 602 may be integrated into a bridge chip. PPUs 602 in a multi-PPU system may be identical to or different from one another. For example, different PPUs 602 might have different numbers of processing cores and/or different amounts of PP memory 604. In implementations where multiple PPUs 602 are present, those PPUs may be operated in parallel to process data at a higher throughput than is possible with a single PPU 602. Systems incorporating one or more PPUs 602 may be implemented in a variety of configurations and form factors, including, without limitation, desktops, laptops, handheld personal computers or other handheld devices, servers, workstations, game consoles, embedded systems, and the like.

Figure 7:
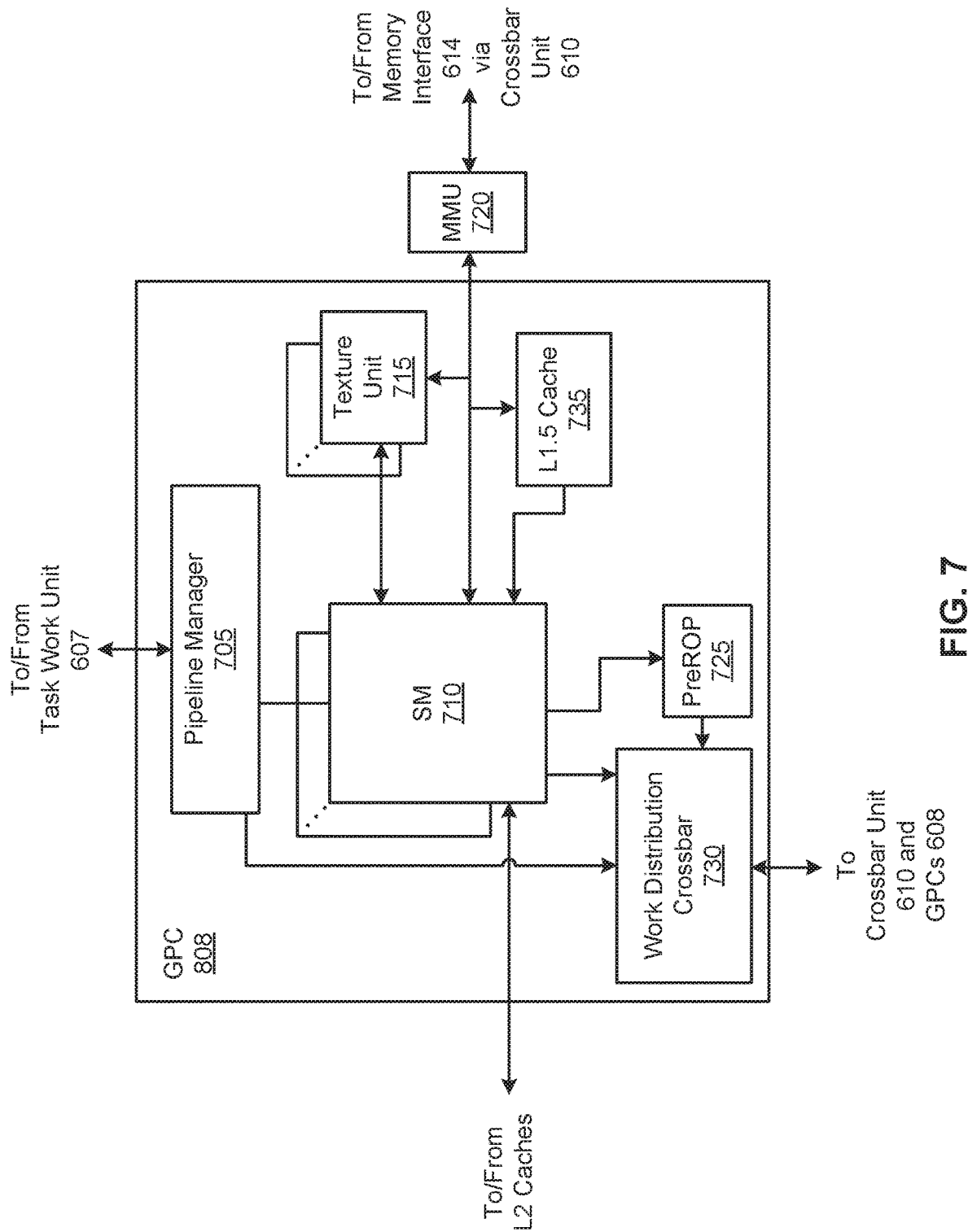
FIG. 7 is a block diagram of a general processing cluster (GPC) included in the parallel processing unit (PPU) of FIG. 6, according to various embodiments.

FIG. 7 is a block diagram of a general processing cluster (GPC) 608 included in the parallel processing unit (PPU) 602 of FIG. 6, according to various embodiments. As shown, the GPC 608 includes, without limitation, a pipeline manager 705, one or more texture units 715, a preROP unit 725, a work distribution crossbar 730, and an L1.5 cache 735.

In one embodiment, GPC 608 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 608. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

In one embodiment, operation of GPC 608 is controlled via a pipeline manager 705 that distributes processing tasks received from a work distribution unit (not shown) within task/work unit 607 to one or more streaming multiprocessors (SMs) 710. Pipeline manager 705 may also be configured to control a work distribution crossbar 730 by specifying destinations for processed data output by SMs 710.

In various embodiments, GPC 608 includes a set of M of SMs 710, where M≥1. Also, each SM 710 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 710 may be provided. In various embodiments, the functional execution units may be configured to support a variety of different operations including integer and floating point arithmetic (e.g., addition and multiplication), comparison operations, Boolean operations (AND, OR, 50R), bit-shifting, and computation of various algebraic functions (e.g., planar interpolation and trigonometric, exponential, and logarithmic functions, etc.). Advantageously, the same functional execution unit can be configured to perform different operations.

In various embodiments, each SM 710 includes multiple processing cores. In one embodiment, the SM 710 includes a large number (e.g., 128, etc.) of distinct processing cores. Each core may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores include 64 single-precision (32-bit) floating point cores, 64 integer cores, 32 double-precision (64-bit) floating point cores, and 8 tensor cores.

In one embodiment, tensor cores configured to perform matrix operations, and, in one embodiment, one or more tensor cores are included in the cores. In particular, the tensor cores are configured to perform deep learning matrix arithmetic, such as convolution operations for neural network training and inferencing. In one embodiment, each tensor core operates on a 4×4 matrix and performs a matrix multiply and accumulate operation D=A×B+C, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use tensor cores from a CUDA-C++ program. At the CUDA level, the warp-level interface assumes 16×16 size matrices spanning all 32 threads of the warp.

Neural networks rely heavily on matrix math operations, and complex multi-layered networks require tremendous amounts of floating-point performance and bandwidth for both efficiency and speed. In various embodiments, with thousands of processing cores, optimized for matrix math operations, and delivering tens to hundreds of TFLOPS of performance, the SMs 710 provide a computing platform capable of delivering performance required for deep neural network-based artificial intelligence and machine learning applications.

In various embodiments, each SM 710 may also comprise multiple special function units (SFUs) that perform special functions (e.g., attribute evaluation, reciprocal square root, and the like). In one embodiment, the SFUs may include a tree traversal unit configured to traverse a hierarchical tree data structure. In one embodiment, the SFUs may include texture unit configured to perform texture map filtering operations. In one embodiment, the texture units are configured to load texture maps (e.g., a 2D array of texels) from memory and sample the texture maps to produce sampled texture values for use in shader programs executed by the SM. In various embodiments, each SM 710 also comprises multiple load/store units (LSUs) that implement load and store operations between the shared memory/L1 cache and register files internal to the SM 710.

In one embodiment, each SM 710 is configured to process one or more thread groups. As used herein, a "thread group" or "warp" refers to a group of threads concurrently executing the same program on different input data, with one thread of the group being assigned to a different execution unit within an SM 710. A thread group may include fewer threads than the number of execution units within the SM 710, in which case some of the execution may be idle during cycles when that thread group is being processed. A thread group may also include more threads than the number of execution units within the SM 710, in which case processing may occur over consecutive clock cycles. Since each SM 710 can support up to G thread groups concurrently, it follows that up to G*M thread groups can be executing in GPC 608 at any given time.

Additionally, in one embodiment, a plurality of related thread groups may be active (in different phases of execution) at the same time within an SM 710. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 710, and m is the number of thread groups simultaneously active within the SM 710. In some embodiments, a single SM 710 may simultaneously support multiple CTAs, where such CTAs are at the granularity at which work is distributed to the SMs 710.

In one embodiment, each SM 710 contains a level one (L1) cache or uses space in a corresponding L1 cache outside of the SM 710 to support, among other things, load and store operations performed by the execution units. Each SM 710 also has access to level two (L2) caches (not shown) that are shared among all GPCs 608 in PPU 602. The L2 caches may be used to transfer data between threads. Finally, SMs 710 also have access to off-chip "global" memory, which may include PP memory 604 and/or system memory 504. It is to be understood that any memory external to PPU 602 may be used as global memory. Additionally, as shown in FIG. 7, a level one-point-five (L1.5) cache 735 may be included within GPC 608 and configured to receive and hold data requested from memory via memory interface 614 by SM 710. Such data may include, without limitation, instructions, uniform data, and constant data. In embodiments having multiple SMs 710 within GPC 608, the SMs 710 may beneficially share common instructions and data cached in L1.5 cache 735.

In one embodiment, each GPC 608 may have an associated memory management unit (MMU) 720 that is configured to map virtual addresses into physical addresses. In various embodiments, MMU 720 may reside either within GPC 608 or within the memory interface 614. The MMU 720 includes a set of page table entries (PTEs) used to map a virtual address to a physical address of a tile or memory page and optionally a cache line index. The MMU 720 may include address translation lookaside buffers (TLB) or caches that may reside within SMs 710, within one or more L1 caches, or within GPC 608.

In one embodiment, in graphics and compute applications, GPC 608 may be configured such that each SM 710 is coupled to a texture unit 715 for performing texture mapping operations, such as determining texture sample positions, reading texture data, and filtering texture data.

In one embodiment, each SM 710 transmits a processed task to work distribution crossbar 730 in order to provide the processed task to another GPC 608 for further processing or to store the processed task in an L2 cache (not shown), parallel processing memory 604, or system memory 504 via crossbar unit 610. In addition, a pre-raster operations (preROP) unit 725 is configured to receive data from SM 710, direct data to one or more raster operations (ROP) units within partition units 615, perform optimizations for color blending, organize pixel color data, and perform address translations.

It will be appreciated that the architecture described herein is illustrative and that variations and modifications are possible. Among other things, any number of processing units, such as SMs 710, texture units 715, or preROP units 725, may be included within GPC 608. Further, as described above in conjunction with FIG. 6, PPU 602 may include any number of GPCs 608 that are configured to be functionally similar to one another so that execution behavior does not depend on which GPC 608 receives a particular processing task. Further, each GPC 608 operates independently of the other GPCs 608 in PPU 602 to execute tasks for one or more application programs.

Figure 8:
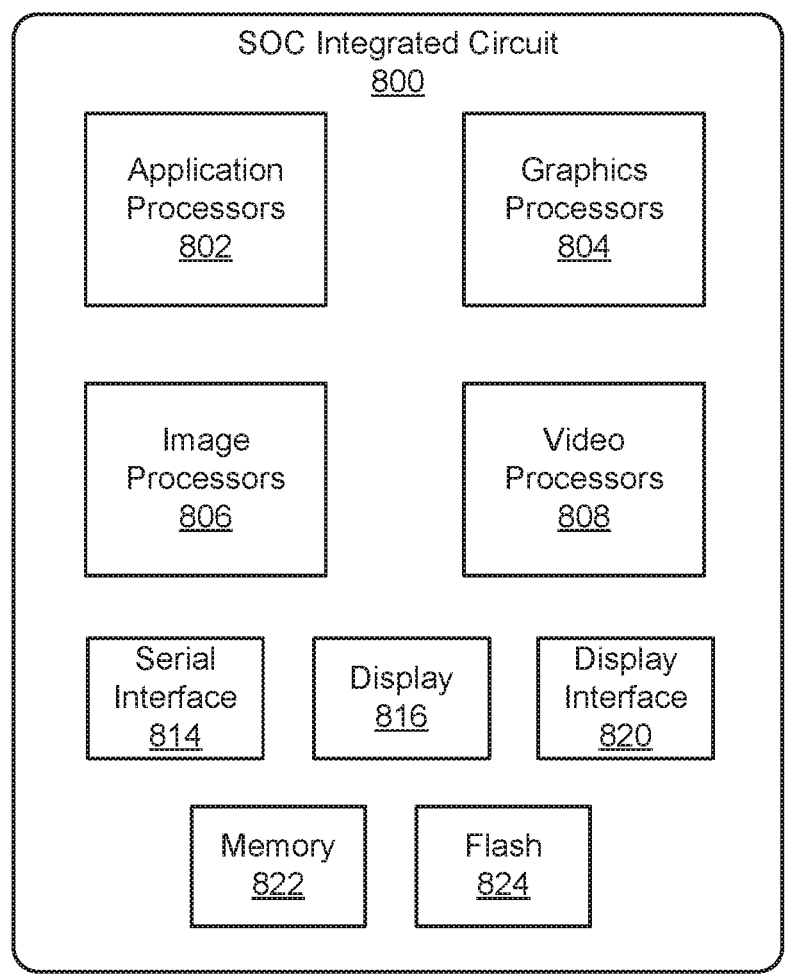
FIG. 8 is a block diagram of an exemplary system on a chip (SoC) integrated circuit, according to various embodiments.

FIG. 8 is a block diagram of an exemplary system on a chip (SoC) integrated circuit 800, according to various embodiments. SoC integrated circuit 800 includes one or more application processors 802 (e.g., CPUs), one or more graphics processors 804 (e.g., GPUs), one or more image processors 806, and/or one or more video processors 808. SoC integrated circuit 800 also includes peripheral or bus components such as a serial interface controller 814 that implements Universal Serial Bus (USB), Universal Asynchronous Receiver/Transmitter (UART), Serial Peripheral Interface (SPI), Secure Digital Input Output (SDIO), inter-IC sound ($I^2S$), and/or Inter-Integrated Circuit ($I^2C$). SoC integrated circuit 800 additionally includes a display device 818 coupled to a display interface 820 such as high-definition multimedia interface (HDMI) and/or a mobile industry processor interface (MIPI). SoC integrated circuit 800 further includes a Flash memory subsystem 824 that provides storage on the integrated circuit, as well as a memory controller 822 that provides a memory interface for access to memory devices.

In one or more embodiments, SoC integrated circuit 800 is implemented using one or more types of integrated circuit components. For example, SoC integrated circuit 800 may include one or more processor cores for application processors 802 and/or graphics processors 804. Additional functionality associated with serial interface controller 814, display device 818, display interface 820, image processors 806, video processors 808, AI acceleration, machine vision, and/or other specialized tasks may be provided by application-specific integrated circuits (ASICs), application-specific standard parts (ASSPs), field-programmable gate arrays (FPGAs), and/or other types of customized components.

In sum, the disclosed techniques use a VAE to learn priors associated with meshes and/or portions of meshes. A decoder in the VAE is used to generate additional meshes of objects by searching the latent space of the VAE for latent vector values that reduce errors between the meshes and image observations of the objects. Each mesh may also be subdivided into meshlets, and shapes and poses of the meshlets may be individually refined to meet geometric constraints associated with the image observations before the meshlets are combined back into the mesh.

One technological advantage of the disclosed techniques is that mesh priors learned by the VAE are used to perform inverse rendering of objects in a way that enforces geometric constraints associated with image observations of the objects. Another technological advantage of the disclosed techniques includes reduced complexity associated with estimating the global pose of the objects by performing coarse-to-fine rendering of the meshes. A third technological advantage of the disclosed techniques is increased generalizability and reduced complexity in reconstructing the meshes through the division of the meshes into meshlets. Consequently, the disclosed techniques provide technological improvements in machine learning models, computer systems, applications, and/or techniques for performing mesh reconstruction.

1. In some embodiments, a processor comprises logic to predict one or more three-dimensional (3D) mesh representations based on a plurality of digital images, wherein the one or more 3D mesh representations are refined by minimizing a difference between the one or more 3D mesh representations and the plurality of digital images.

2. The processor of clause 1, wherein predicting the one or more 3D mesh representations based on the plurality of digital images comprises executing a machine learning model to produce a mesh of an object from a first value in a latent space; and refining the mesh of the object by selecting a second value in the latent space based on one or more geometric constraints associated with the plurality of digital images of the object.

3. The processor of clauses 1-2, wherein refining the mesh of the object comprises selecting the first value; calculating an error between the mesh and the plurality of digital images of the object; and performing gradient descent on the first value with parameters of the machine learning model to reduce the error.

4. The processor of clauses 1-3, wherein selecting the first value comprises at least one of randomizing the first value, selecting the first value based on the set of image observations, and initializing the first value based on sparse features extracted from the set of image observations.

5. The processor of clauses 1-4, wherein refining the mesh of the object comprises dividing the mesh into a set of meshlets; for each meshlet in the set of meshlets, selecting the second value in the latent space to learn a prior for a portion of the mesh represented by the meshlet; and reconstructing the mesh from the set of meshlets.

6. The processor of clauses 1-5, wherein refining the mesh of the object further comprises, for each meshlet in the set of meshlets, learning a custom pose of the meshlet that aligns a global pose of the images with a canonical pose of the meshlet.

7. The processor of clauses 1-6, wherein refining the mesh of the object further comprises iteratively increasing a resolution of the set of meshlets to meet the one or more geometric constraints.

8. The processor of clauses 1-7, wherein the logic further generates the machine learning model as a variational autoencoder to reconstruct a set of training meshes inputted into the variational autoencoder.

9. The processor of clauses 1-8, wherein generating the machine learning model comprises for each training mesh in the set of training meshes, aggregating multiple orderings of points in the training mesh into a standardized value in the latent space; and training a decoder in the variational autoencoder to reconstruct the training mesh from the standardized value.

10. The processor of clauses 1-9, wherein aggregating the multiple orderings of points in the training mesh into the standardized value comprises applying an encoder to the multiple orderings of points to generate intermediate representations of the multiple orderings of points; and averaging the intermediate representations into the standardized value.

11. In some embodiments, a method comprises predicting one or more three-dimensional (3D) mesh representations based on a plurality of digital images, wherein the one or more 3D mesh representations are refined by minimizing at least one difference between the one or more 3D mesh representations and the plurality of digital images.

12. The method of clause 11, wherein predicting the one or more 3D mesh representations based on the plurality of digital images comprises executing a machine learning model to produce a mesh of an object from a first value in a latent space; and refining the mesh of the object by selecting a second value in the latent space based on one or more geometric constraints associated with the plurality of digital images of the object.

13. The method of clauses 11-12, further comprising generating the machine learning model as a variational autoencoder to reconstruct a set of training meshes inputted into the variational autoencoder.

14. The method of clauses 11-13, wherein generating the machine learning model comprises for each training mesh in the set of training meshes, aggregating multiple orderings of points in the training mesh into a standardized value in the latent space; and training a decoder in the variational autoencoder to reconstruct the training mesh from the standardized value.

15. The method of clauses 11-14, wherein aggregating the multiple orderings of points in the training mesh into the standardized value comprises applying an encoder to the multiple orderings of points to generate intermediate representations of the multiple orderings of points; and averaging the intermediate representations into the standardized value.

16. In some embodiments, a non-transitory computer readable medium store instructions that, when executed by a processor, cause the processor to at least execute a machine learning model to produce a mesh of an object from a first value in a latent space; refine the mesh of the object by selecting a second value in the latent space based on one or more geometric constraints associated with a set of image observations of the object; and store the mesh in association with the object.

17. The non-transitory computer readable medium of clause 16, wherein refining the mesh of the object comprises selecting the first value; and performing gradient descent on the first value with parameters of the machine learning model to reduce an error between the mesh and the set of image observations.

18. The non-transitory computer readable medium of clauses 16-17, wherein the error comprises at least one of a photometric error and a silhouette error.

19. The non-transitory computer readable medium of clauses 16-18, wherein refining the mesh of the object comprises dividing the mesh into a set of meshlets; for each meshlet in the set of meshlets, selecting the second value in the latent space to learn a prior for a portion of the mesh represented by the meshlet; and reconstructing the mesh from the set of meshlets.

20. The non-transitory computer readable medium of clauses 16-19, wherein refining the mesh of the object further comprises iteratively increasing a resolution of the set of meshlets to meet the one or more geometric constraints.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A processor, comprising:
   logic to predict one or more three-dimensional (3D) meshes based on a plurality of digital images, wherein the one or more 3D meshes are refined using a trained decoder based on differences between the one or more 3D meshes and the plurality of digital images;
   wherein predicting the one or more 3D meshes based on the plurality of digital images comprises:
      executing the decoder to produce a mesh of an object from a first value in a latent space; and
      refining the mesh of the object using the decoder, wherein refining the mesh of the object comprises selecting a second value in the latent space based on one or more geometric constraints associated with the plurality of digital images of the object;
   wherein refining the mesh of the object comprises:
      dividing the mesh into a set of meshlets;
      for each meshlet in the set of meshlets, selecting the second value in the latent space to learn a prior for a portion of the mesh represented by the meshlet; and
      reconstructing the mesh from the set of meshlets; and
   wherein refining the mesh of the object further comprises iteratively increasing a resolution of the set of meshlets to meet the one or more geometric constraints.

2. A non-transitory computer readable medium storing instructions that, when executed by a processor, cause the processor to at least:
   predict one or more three-dimensional (3D) meshes based on a plurality of digital images, wherein the one or more 3D meshes are refined using a trained decoder based on differences between the one or more 3D meshes and the plurality of digital images;
   wherein the instructions further include instructions that, when executed by the processor, cause the processor to at least refine a mesh of an object by at least;
      selecting a first value; and
      performing gradient descent on the first value using the decoder to reduce an error between the mesh and a set of image observations;
   wherein refining the mesh of the object comprises: dividing the mesh into a set of meshlets;
   for each meshlet in the set of meshlets, selecting the second value in a latent space to learn a prior for a portion of the mesh represented by the meshlet; and
   reconstructing the mesh from the set of meshlets; and
   wherein refining the mesh of the object further comprises iteratively increasing a resolution of the set of meshlets to meet the one or more geometric constraints.

* * * * *